(12) United States Patent
Whitler

(10) Patent No.: US 9,262,756 B2
(45) Date of Patent: Feb. 16, 2016

(54) POINT-OF-SALE ("POS") CONTROLLER

(71) Applicant: Bank of America Corporation, Charlotte, NC (US)

(72) Inventor: Elbert Lee Whitler, Webster Groves, MO (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/732,390

(22) Filed: Jan. 1, 2013

(65) Prior Publication Data

US 2014/0188642 A1     Jul. 3, 2014

(51) Int. Cl.
  *G06Q 20/40* (2012.01)
  *G06Q 20/38* (2012.01)
  *G06Q 30/02* (2012.01)
  *G06Q 20/20* (2012.01)

(52) U.S. Cl.
  CPC .............. *G06Q 20/202* (2013.01); *G06Q 20/20* (2013.01); *G06Q 20/38* (2013.01); *G06Q 20/405* (2013.01); *G06Q 20/387* (2013.01); *G06Q 30/0213* (2013.01)

(58) Field of Classification Search
  None
  See application file for complete search history.

(56) References Cited

U.S. PATENT DOCUMENTS

| | | | |
|---|---|---|---|
| 3,815,269 A | 6/1974 | Roselli | |
| 6,012,048 A | 1/2000 | Gustin et al. | |
| 6,105,001 A | 8/2000 | Masi et al. | |
| 6,129,272 A | 10/2000 | Yoshida et al. | |
| 6,328,207 B1 | 12/2001 | Gregoire et al. | |
| 6,626,356 B2 | 9/2003 | Davenport et al. | |
| 6,999,943 B1 | 2/2006 | Johnson et al. | |
| 7,255,200 B1 | 8/2007 | Walter | |
| 7,308,356 B2 | 12/2007 | Melaku et al. | |
| 7,379,920 B2 | 5/2008 | Leung et al. | |
| 7,387,250 B2 | 6/2008 | Muni | |
| 7,447,657 B1 | 11/2008 | Krajewski et al. | |
| 7,668,780 B2 | 2/2010 | Battaglini et al. | |
| 7,882,026 B1 | 2/2011 | Zettner | |
| 7,949,555 B2 | 5/2011 | Young et al. | |

(Continued)

OTHER PUBLICATIONS

"Credit Card Processing Calculator" (http://www.merchantcouncil.org/merchant-account/review-compare/credit-card-calculator.php), Merchantcouncil.org, Domains by Proxy, LLC (registrant), Scottsdale, Arizona, Aug. 1, 2012.

(Continued)

*Primary Examiner* — Allen Chein
(74) *Attorney, Agent, or Firm* — Weiss & Arons LLP; Michael A. Springs, Esq.

(57) ABSTRACT

Apparatus and methods are provided for adjusting a transaction cost and/or a transaction cost recovery amount. The adjusting may be based on a comparison of historical usage of a first payment instrument relative to use of a second payment instrument. Usage of the first or second payment instruments may be correlated to imposition of the transaction cost recovery amount. The adjusting may be based on determining a convenience fee and/or a transaction cost recovery amount for a funds transfer. The adjusting may be based on identifying a purchasing behavior. The purchasing behavior may include terminated or reduced spending, relative to historical spending, at a location that imposes a transaction cost recovery amount. The purchasing behavior may include identifying current payment instrument use at a location that imposes a transaction cost recovery amount.

13 Claims, 15 Drawing Sheets

(56) References Cited

U.S. PATENT DOCUMENTS

| | | | |
|---|---|---|---|
| 8,301,559 B2 | 10/2012 | McElroy et al. | |
| 2002/0049632 A1* | 4/2002 | Parkinson | 705/14 |
| 2002/0128967 A1 | 9/2002 | Meyer et al. | |
| 2002/0143655 A1 | 10/2002 | Elston et al. | |
| 2003/0074316 A1 | 4/2003 | McCallum | |
| 2003/0126139 A1 | 7/2003 | Lee et al. | |
| 2003/0216969 A1 | 11/2003 | Bauer et al. | |
| 2004/0024707 A1* | 2/2004 | Perre et al. | 705/42 |
| 2004/0044627 A1 | 3/2004 | Russell et al. | |
| 2005/0004839 A1 | 1/2005 | Bakker et al. | |
| 2006/0229998 A1 | 10/2006 | Harrison et al. | |
| 2007/0124216 A1 | 5/2007 | Lucas | |
| 2007/0175984 A1 | 8/2007 | Khandaker et al. | |
| 2007/0288372 A1 | 12/2007 | Behar et al. | |
| 2007/0294318 A1 | 12/2007 | Arora et al. | |
| 2008/0208680 A1 | 8/2008 | Cho | |
| 2008/0270209 A1 | 10/2008 | Mauseth | |
| 2008/0270275 A1 | 10/2008 | McElroy et al. | |
| 2008/0275774 A1 | 11/2008 | Pepe et al. | |
| 2009/0063291 A1 | 3/2009 | Robbins et al. | |
| 2009/0108080 A1 | 4/2009 | Meyer et al. | |
| 2009/0132312 A1 | 5/2009 | Reinheimer et al. | |
| 2009/0222337 A1 | 9/2009 | Sergiades | |
| 2009/0327124 A1* | 12/2009 | McElroy et al. | 705/39 |
| 2010/0100422 A1* | 4/2010 | Schwarz et al. | 705/10 |
| 2010/0153266 A1 | 6/2010 | Plunkett et al. | |
| 2010/0169170 A1 | 7/2010 | Fordyce, III et al. | |
| 2010/0250379 A1 | 9/2010 | Giordano et al. | |
| 2010/0280948 A1 | 11/2010 | Cohen | |
| 2011/0054992 A1 | 3/2011 | Liberty et al. | |
| 2011/0078032 A1 | 3/2011 | Johnson | |
| 2011/0125564 A1 | 5/2011 | DeLillio | |
| 2011/0137789 A1 | 6/2011 | Kortina et al. | |
| 2011/0145145 A1 | 6/2011 | Battaglini et al. | |
| 2011/0231314 A1 | 9/2011 | Sears et al. | |
| 2011/0302080 A1 | 12/2011 | White et al. | |
| 2011/0307359 A1 | 12/2011 | Gude et al. | |
| 2012/0029982 A1 | 2/2012 | Andrade | |
| 2012/0030045 A1 | 2/2012 | Smith, III | |
| 2012/0047007 A1* | 2/2012 | Halsey et al. | 705/14.14 |
| 2012/0078790 A1 | 3/2012 | Ornce et al. | |
| 2012/0150743 A1 | 6/2012 | Isaacson et al. | |
| 2012/0158566 A1 | 6/2012 | Fok et al. | |
| 2012/0271707 A1 | 10/2012 | Harrison et al. | |
| 2013/0054465 A1 | 2/2013 | Sakata et al. | |
| 2013/0103452 A1* | 4/2013 | Burks et al. | 705/7.25 |
| 2014/0039999 A1 | 2/2014 | Levene et al. | |

OTHER PUBLICATIONS

"Interchange Profit Calculator" (http://www.greensheet.com/legacy/Interchange_Profit_Calculator.xls), The Green Sheet Inc., Santa Rosa, California, Aug. 1, 2012.

Djurdjevic, Nebo, "Commentary: Mobile payments and low value transactions" (http://www.mobilepaymentstoday.com/article/193382/Commentary-Mobile-payments-and-low-value-transactions), Mobilepaymentstoday.com, Networld Media Group (registrant), Louisville, Kentucky, Apr. 20, 2012.

Papadimitriou, Odysseas, "No Credit Cards for Purchases Under $10" (http://www.cardhub.com/edu/10-dollar-credit-card-payments/), Cardhub.com, Evolution Finance, Inc. (registrant), Arlington, Virginia, Sep. 2, 2011.

"Card security code" (http://en.wikipedia.org/wiki/Card_Code_Verification), Wikipedia.org, Wikimedia Foundation, Inc. (registrant), San Francisco, California, Sep. 27, 2012.

"Send someone money . . . " (https://www.paypal.com/webapps/mpp/send-money-online), Paypal.com, PayPal Inc. (registrant), San Jose, California, Dec. 13, 2012.

"Definition of 'Percentage' by the Free Online Dictionary," TheFreeDictionary.com, Jul. 24, 2013.

"19 Walmart Stores near '22314,'" Walmart.com, Jul. 24, 2013.

"Seen at 11: Retailers Ready to Force Consumers to Pay 'Swipe Fee' for Using Plastic," NewYork.cbslocal.com, Jul. 27, 2012.

Meece, Mickey, "Be Aware: Credit Card Purchases May Soon Carry a Surcharge," Forbes.com, Jul. 13, 2012.

United States District Court for the Eastern District of New York, Proposed "Class Settlement Agreement," Document 1588-1, Case No. 05-MD-01720-JG-JO (In Re Payment Card Interchange Fee and Merchant Discount Antitrust Litigation), Jul. 13, 2012, Brooklyn, New York.

* cited by examiner

400

Transaction Record

| POS Attributes $X_{1...J}$ | Surcharge Attributes $Y_{1...K}$ | Synoptic Attributes $Z_{1...L}$ |
|---|---|---|
| 401 | 403 | 405 |

FIG. 4

Transaction Cost Directive

| | | | | |
|---|---|---|---|---|
| Merchant | Retailer XYZ | | | |
| MCC | 123456 | | | |
| Location | 123 Main St Anytown, US 12345 | | | |
| Performance Metric | Daily frequency-of-use | | | |
| Time Period | July - October | | | |
| Surcharge Imposed | Bank B: .02 + 15¢ | Bank A: .01 + 10¢ | Card B: .02 | Network 1: .03 |
| Effect of Surcharge on Performance metric | Bank B: ⇨ 30% | Bank A: No Change | Card B: ⇨ 20% | Network 1: ⇨ 35% |
| Transaction Cost Demand | Lower Transaction Cost by 30% | Lower Transaction Cost by 10% | Lower Transaction Cost by 15% | Lower Transaction Cost by 40% |
| Revised Surcharge | Bank B: .02 | Card A: .01 | Card B: No Charge | Network 1: .015 |

1100

1101 — Merchant / MCC / Location
1103 — Performance Metric
1105 — Time Period
1107 — Surcharge Imposed
1109 — Effect of Surcharge on Performance metric
1111 — Transaction Cost Demand
1113 — Revised Surcharge

| Date | Time Stamp | Payment Instrument Identifier | MCC | Region | Sale Amount | Surcharge Fraction | Surcharge Amount |
|---|---|---|---|---|---|---|---|
| Jan 1, 2012 | 00:12 | 001 | 12345 | 1 | $25 | .12 | $3 |
| Jan 1, 2012 | 1:30 | 005 | 12345 | 1 | $100 | .03 | $3 |
| Jan 1, 2012 | 3:34 | 006 | 12345 | 2 | $150 | .02 | $3 |
| Jan 2, 2012 | 4:10 | 0010 | 12345 | 5 | $10 | .3 | $3 |
| Jan 2, 2012 | 4:20 | 002 | 12345 | 3 | $75 | .04 | $3 |
| Jan 2, 2012 | 4:23 | 001 | 12345 | 3 | $47 | .06 | $3 |

| Date | Time Stamp | Payment Instrument Identifier | MCC | Region | Sale Amount | Surcharge Fraction | Surcharge Amount |
|---|---|---|---|---|---|---|---|
| Jan 1, 2012 | 00:12 | 001 | 12345 | 1 | $125 | .12 | $1.25 |
| Jan 1, 2012 | 1:30 | 005 | 98765 | 1 | $125 | .03 | $3.75 |
| Jan 1, 2012 | 3:34 | 006 | 23456 | 2 | $125 | .02 | $2.50 |
| Jan 2, 2012 | 4:10 | 0010 | 45678 | 5 | $125 | .3 | $3.75 |
| Jan 2, 2012 | 4:20 | 002 | 45678 | 3 | $125 | .04 | $5.00 |
| Jan 2, 2012 | 4:23 | 001 | 5431 | 3 | $125 | .06 | $7.50 |

POINT-OF-SALE ("POS") CONTROLLER

FIELD OF TECHNOLOGY

Aspects of the disclosure relate to providing apparatus and methods for recovering a transaction cost in connection with a transaction between two or more transaction participants (hereinafter "TP").

BACKGROUND

In a transaction, a customer (the "customer") may purchase from a merchant ("the merchant") goods or services ("the product") using credit. The credit may be extended to the customer by an issuing bank (the "issuer"). The issuer may authorize the transaction before extending credit to customer. The merchant may present the transaction to an acquiring bank (the "acquirer"). Each transaction presented to the acquirer may be embodied in a transaction record. The acquirer pays the merchant for (and thus "acquires") the product. A transaction processing network in communication with the issuer and the acquirer settles the transaction between the issuer and the acquirer. The transaction processing network may collect transaction processing network fees from the issuer and the acquirer in connection with the settlement.

Settling the transaction may include the transaction network receiving a plurality of transactions from the acquirer. Each transaction may be embodied in a transaction record. In response to receiving the transaction records, the transaction network may debit an account of the issuer. The debit may correspond to the amount authorized by the issuer. The transaction network may credit an account of the acquirer. The amount credited to the acquirer may correspond to the amount authorized by the issuer.

Settlement may include a transfer of funds between two or more TPs. The transfer may be a "book transfer," an interbank transfer or any suitable transfer between TPs. A settlement network may transfer the funds between TPs. Illustrative settlement networks may include the Federal Reserve Wire Network ("Fedwire") and other suitable settlement networks that are well known to those of ordinary skill in the art. The settlement network may be any suitable network linking one or more accounts of TPs.

One TP may impose a transaction cost upon another TP for participating in the transaction. The transaction cost may be referred to as "interchange." Interchange may be a fixed fee and/or a percentage of the purchase amount. Interchange may be a fixed fee and/or a percentage of the transaction cost. Interchange may be determined based on one or more rules set by a TP or a government agency.

Interchange flows from the acquirer, through the transaction processing network, to the issuer. For example, the issuer may transfer to the acquirer an amount net interchange. The issuer typically uses interchange to cover costs of acquiring credit card customers, servicing credit card accounts, providing incentives to retain customers, mitigating fraud, covering customer credit risk, group compensation and other expenses. Interchange may be a transaction cost imposed on the acquirer.

The acquirer may deduct a merchant discount from the amount that the acquirer pays the merchant in exchange for the product. The merchant discount may cover the acquirer's transaction processing network fee, interchange, and other expenses. The merchant discount may include a profit for the acquirer. The merchant discount may be a transaction cost imposed on the merchant.

FIG. 1 shows typical credit card transaction settlement flow 100. Flow 100 involves TPs such as the merchant, the customer, and transaction service providers that are identified below. At step 1, the merchant provides information, relating to a proposed transaction between the merchant and a customer, to a transaction authorization and clearance provider. The transaction authorization and clearance provider may be a transaction processing network. The transaction authorization and clearance provider may provide transaction authorization and clearance information to the merchant. The transaction authorization and clearance information may include authorization for the transaction to proceed.

At step 2, the merchant provides $100 in product to the customer. The customer pays with a credit card. At step 3, the issuer transmits to the customer a statement showing the purchase price of ($100.00) due. The issuer collects the purchase price amount, along with interest and fees if appropriate, from the customer. At step 4, the issuer routes the purchase price amount of ($100.00) through the transaction processing network to the acquirer. At step 5, the acquirer partially reimburses the merchant for the purchase price amount. In the example shown in FIG. 1, the partial reimbursement is $98.00. The difference between the reimbursement amount ($98.00) and the purchase price amount ($100.00) is a two dollar ($2.00) transaction cost.

At step 6, the acquirer pays a transaction cost ($1.50), via the transaction processing network, to the issuer. At step 7, both the acquirer and the issuer pay a transaction cost ($0.07 for acquirer and $0.05 for the issuer) to the transaction processing network.

TABLE 1

Net positions, by participant, based on settlement flow 100 (shown in FIG. 1).

| Participant | Net ($) |
| --- | --- |
| Issuer | 1.45 |
| Acquirer | 0.43 |
| Transaction processing network | 0.12 |
| Merchant | −2.00 |
| Customer | 0 |

In settlement 100 (shown in FIG. 1), the transaction cost is based on an exemplary merchant discount rate of 2%. The $1.50 interchange is based on an exemplary interchange rate of 1.5%. The sum of the transaction processing network fees ($0.07 and $0.05) is based on a total exemplary transaction processing network fee rate of 0.12%.

Transaction processing networks and transaction processing network services are offered under trademarks known to those of ordinary skill in the art. Transaction processing networks may set interchange rates. Issuers may set interchange rates. Interchange rates may vary for each transaction processing network. Interchange rates may vary based on merchant type and size, transaction processing method, transaction volume and other factors.

A merchant, or other TP, may impose a surcharge for accepting a credit card, establish minimum or maximum purchase price amounts or refuse to accept selected payment credit cards. The surcharge may allow the merchant to recover some or all of the transaction cost charged to the merchant by other TPs. The surcharge imposed by the merchant may be determined based on a total transaction cost associated with the transaction. The total transaction cost may include interchange, the merchant discount, network fees and other fees charged for processing transaction.

The surcharge imposed by the merchant may be determined based on a risk that a customer will curtail spending at a merchant that imposes a surcharge. The surcharge imposed by the merchant may be determined based on an effect of the surcharge on a performance metric. The surcharge imposed by the merchant may be determined based on any suitable merchant performance metric or change in performance metric.

It would be desirable, therefore, to provide apparatus and methods for determining a merchant specific transaction cost recovery amount.

As an alternative or in addition to recovering a transaction cost by imposing a surcharge, a TP may wish to reduce a transaction cost associated with a processing a transaction. It would be desirable, therefore, to provide apparatus and methods for determining a transaction cost.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 4 shows illustrative information in accordance with the principles of the invention;
FIG. 11 shows illustrative information in accordance with the principles of the invention.

DETAILED DESCRIPTION OF THE INVENTION

Apparatus and methods for adjusting a transaction cost are provided. The transaction cost may be associated with a transaction. The transaction cost may include one or more fees charged to a TP to process the transaction. The transaction cost may be associated with processing the transaction. The processing may include one transaction participant providing services to another transaction participant. The transaction cost may be associated with services performed or provided on behalf of the merchant, the issuer, the acquirer, the customer or any suitable transaction participant.

For example, the transaction cost may include the interchange fee. The transaction cost may include the network fee. The transaction cost may include the fee for providing a transaction service. The transaction cost may include the fee imposed by one transaction participant on another transaction participant in connection with the transaction. Illustrative transaction services are listed in Table 2.

TABLE 2

Illustrative transaction services.
Illustrative Transaction Service

Figure 1:
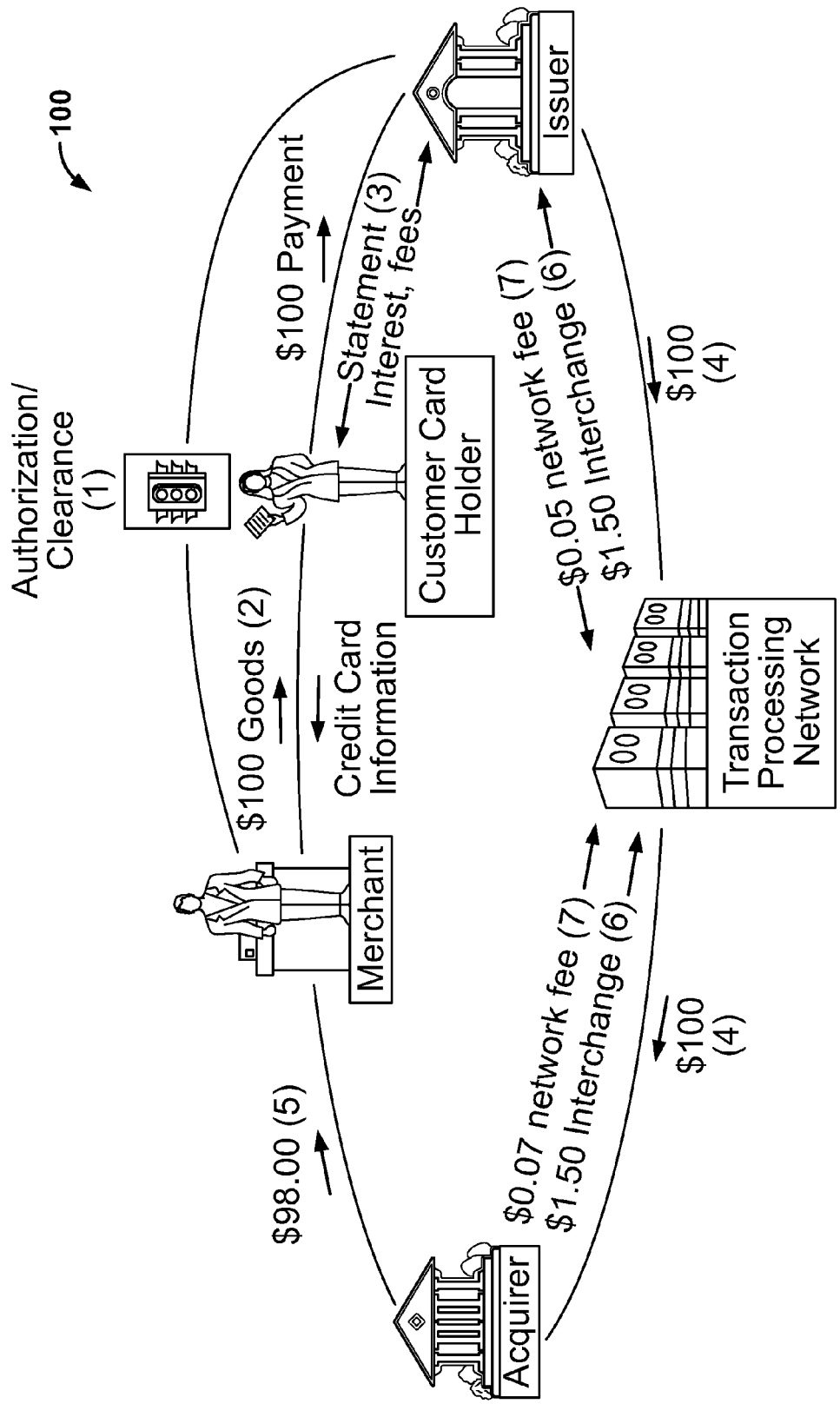
FIG. 1 shows a prior art scenario.

Sale of goods to customer
Authorization of customer credit
Clearance of customer credit
Notice of customer balance
Invoice of customer for bank service
Invoice of network fee
Invoice of interchange fee
Acquisition of goods
Collection of balance from customer
Settlement of merchant account
Transfer of funds to acquirer
Debit of funds from issuer
Transmission of surcharge notice
Identification of potential customers
Transmission of special offers
Escrow account maintenance
Escrow account security
Matching of acquirer and issuer
Payee/payor identity verification prior to releasing escrow funds In some circumstances, a participant may perform more than one of the services. Each transaction service may be associated with a transaction cost. Each participant may charge a fee for providing the transaction service. The fee may be charged to one or more of the other TPs (as shown in FIG. 1). Table 3 shows illustrative TP types.

TABLE 3

Illustrative transaction participant types.
Illustrative TP Types

Merchant
Customer
Authorization service provider
Clearance service provider
Settlement service provider
Issuer
Network
Acquirer
Transaction broker More than one participant of a given type may be available to participate in the transaction. Different participants of the same type may have advantages and/or disadvantages relative to the other participants of that type. For example, one issuer may be a member of a lending consortium while another is not a member, one transaction processing network may require payment of a relatively small interchange fee while another network may require payment of a relatively large interchange fee, and the like.

A transaction may involve an acceptance of a payment instrument by a merchant. The payment instrument may be presented by a customer. The payment instrument may be presented to the merchant by the customer as payment for a product. A transaction cost may be associated with acceptance, by the merchant, of the payment instrument as a form of payment. The transaction cost may be an acceptance cost associated with the payment instrument.

The acceptance cost may include a fee a merchant pays to other TPs. The fee may enable the merchant to accept a payment instrument as form of payment for a product. The fee may enable the merchant to establish a connection with a transaction processing network. Payment of the fee may enable the merchant to transmit/receive payments to/from a transaction network or acquirer associated with the payment instrument.

A payment instrument may include a credit card and/or other forms of payment instruments. Such other forms of payment instruments may include: cash, a check, a debit card, an instrument or device that includes a contactless chip, such as an ISO14443-compliant contactless chip, a smart phone, a tablet computer, a transponder or any other suitable electronic purchasing devices. Payment instruments may store data in a magnetic strip, a bar code, a silicon chip, non-volatile computer readable media or any other suitable data storage device or format. The merchant may provide a point-of-sale ("POS") terminal that is configured to receive data from, provide data to, or exchange data with the payment instrument.

A transaction may be a transaction in any state of completion. The transaction may be a prospective transaction. The prospective transaction may include the customer presenting the payment instrument to pay for the product. The prospective transaction may include the merchant collecting payment instrument information from the customer.

The transaction may be a pending transaction. For example, a transaction may be pending prior to receiving authorization from the issuer. The transaction may be pending during a time between receiving the authorization and settlement. The transaction may be pending during a time prior to collection, by the issuer, of the purchase amount from the customer.

The transaction may be an executed transaction. An executed transaction may include a transaction that has been authorized and settled. Executing the transaction may include a first TP transmitting the transaction to a second TP. Executing the transaction may include a TP completing a procedure associated with the transaction. For example, a transaction may be executed after a customer accepts an amount of credit offered by the issuer.

The transaction may be associated with one or more transaction attributes. The transaction cost may be based on the one or more of the transaction attributes. The transaction record may include one or more surcharge attributes. A surcharge attribute may include one or more characteristics of a transaction attribute. A transaction attribute may include one or more features of a surcharge attribute.

A transaction record may be generated based on one or more transaction attributes received and/or available at a time of purchase. Each transaction record may include one or more fields. Each field may include an attribute associated with the transaction. The attribute may be represented by a value. The value may be stored in the field of the transaction record.

For example, a transaction record may include a merchant category code ("MCC"). The merchant category code may classify a merchant based on a primary line of business. For example, the merchant may be assigned the MCC based on whether the merchant provides predominately goods or provides predominately services. If a merchant provides both goods and services, the MCC assigned to the merchant may correspond to the greater portion of the merchant's business.

The MCC may classify the merchant based on a market segment serviced by the merchant. Exemplary MCCs and associated market segments are shown in Table 4.

TABLE 4

Illustrative MCCs and associated market segments.

| Illustrative Merchant Category Code ("MCC") | Illustrative Associated Market Segment |
| --- | --- |
| 0742 | Veterinary Services |
| 4214 | Motor Freight Carriers and Trucking - Local and Long Distance, Moving and Storage Companies, and Local Delivery Services |
| 4812 | Telecommunication Equipment and Telephone Sales |
| 5047 | Medical, Dental, Ophthalmic, and Hospital Equipment and Supplies |
| 5172 | Petroleum and Petroleum Products |
| 5718 | Fireplace, Fireplace Screens, and Accessories Stores |

The MCC may be associated with a taxation status. For example, if the MCC corresponds to a provider of services, a customer that purchases services from the merchant may not be required to report payments for the services to a government agency.

The MCC may be assigned by the acquirer. The acquirer may assign the MCC to the merchant at a time the merchant agrees to accept the payment instrument as a form of payment. The acquirer may assign the MCC to the merchant in response to the merchant agreeing to accept the payment instrument as a form of payment.

The merchant may be assigned multiple MCCs. For example, the merchant may provide pharmacy products and grocery products. The pharmacy products may be assigned a first MCC and the grocery products may be assigned a second MCC.

The MCC may be associated with another transaction attribute. For example, the merchant may provide predominately pharmacy products at a first location and predominately grocery products at a second location. A transaction that occurs at the first location may be associated with the first MCC. A transaction that occurs at the second location may be associated with the second MCC.

As a further example, the merchant may house a pharmacy and a grocery at a single address. The pharmacy may be associated with a first checkout location and the grocery may be associated with a second checkout location. Purchases made at the first location may be associated with the first MCC and purchases made at the second location may be associated with the second MCC.

Table 5 shows illustrative transaction attributes and associated values.

TABLE 5

Illustrative transaction attributes and associated values.

| Illustrative Transaction Attributes | Illustrative Associated Value |
| --- | --- |
| Geographic | Longitude/latitude<br>GPS coordinates<br>Map coordinates<br>Elevation<br>Depth<br>Distance from a point |

TABLE 5-continued

Illustrative transaction attributes and associated values.

| Illustrative Transaction Attributes | Illustrative Associated Value |
|---|---|
| | Address |
| | Zip code |
| | Area code |
| | County |
| | State |
| | Country |
| | IP address |
| | Signal triangulation |
| Temporal | Seconds |
| | Minutes |
| | Hours |
| | Day |
| | Week |
| | Month |
| | Year |
| | Duration |
| Synoptic | Weather at time of transaction |
| | Stock market performance at time of transaction |
| | Political party in power at time of transaction |
| | TP credit risk |
| Transaction amount | Dollars |
| | Available credit |
| | Currency |
| | Foreign exchange rate |
| | Low value purchase |
| Number of items purchased | Number |
| | Number of distinct stock keeping units ("SKU") |
| | Purchase amount per item |
| Merchant category code | Numerical identifier |
| | Taxation status |
| | Associated acquirer |
| Surcharge | Surcharge amount |
| | Surcharge fraction |
| | Maximum surcharge |
| | Minimum surcharge |
| | Percentage of purchase |
| | Fixed amount |
| Payment instrument identifier | Brand |
| | Rewards |
| | Transaction Network |
| | Issuer |
| | Affinity |
| Loyalty program | Rewards/point balance |
| | Membership level |
| | Duration of membership |
| | Frequency of use |
| Access Channel | Point-of-sale |
| | Automated teller machine |
| | Online portal |
| | Self-service kiosk |
| | Mobile device |
| | In person |

Apparatus and methods for adjusting a transaction cost recovery amount (hereinafter "surcharge") are provided. The surcharge may be imposed on a transaction. The transaction may involve an acceptance of a payment instrument by a merchant. The transaction may involve a credit, debit, prepaid, automated clearing house, or any suitable payment method involving the transfer of funds from one TP to another.

A TP that is charged a transaction cost may impose a surcharge to recoup one or more transaction fees. The surcharge may correspond to an amount charged in addition to a product price. The TP may impose the surcharge to generate a revenue stream. The TP may impose the surcharge on any other suitable TP. For example, a merchant may impose the surcharge on a customer or an acquirer may impose the surcharge on a customer.

The surcharge may be defined by one or more surcharge attributes. The surcharge attribute may be any suitable attribute of the surcharge. For example, a surcharge amount may be a surcharge attribute. The surcharge amount may correspond to an amount charged by a TP to accept a payment instrument. The surcharge amount may be charged to a customer that pays for a product using the payment instrument. The surcharge amount may be charged by a merchant that accepts the payment instrument as a form of payment. The surcharge amount may correspond to all or a portion of the merchant discount paid by the merchant.

The surcharge amount may be determined based on a percentage of the purchase amount. The surcharge amount may be determined based on a percentage of the transaction cost. The surcharge amount may be a flat fee. The surcharge amount may be a combination of a flat fee and a percentage of the purchase amount. The surcharge amount may be any suitable monetary amount.

For example, a surcharge imposed by a merchant may be associated with surcharge attributes corresponding to a surcharge amount, a region, a MCC and a payment instrument. Based on the surcharge attributes, a surcharge may be imposed on a purchase made within the region at the location associated with the MCC using the payment instrument.

The surcharge attribute may include a surcharge fraction (hereinafter "SF"). The surcharge amount may be determined based on the surcharge fraction. The surcharge amount may correspond to a fractional portion of the transaction cost. The surcharge amount may correspond to a fractional portion of the purchase amount.

The fractional portion may be a product of the SF and the transaction cost. An exemplary SF may be defined by $0 \leq SF \leq 1$. For example, if the SF is 0.3, the fractional portion may be approximately ⅓ of the transaction cost. The SF may be determined based on a performance metric. The SF may be associated with a transaction attribute.

The SF may be one. When the SF is one, the surcharge may correspond to the entire transaction cost. The SF may be zero. A SF of zero may correspond to no imposition of a surcharge. When the SF is one, the customer may bear the transaction cost. When the SF is zero, the merchant may bear the transaction cost. When the SF is between zero and one, the transaction cost may be shared by the merchant and customer.

The surcharge attribute may include a type of the payment instrument. The type of payment instrument may correspond to a brand associated with the payment instrument. The brand may correspond to a transaction processing network that processes transactions initiated using the payment instrument. The type of payment instrument may correspond to a product-type associated with the payment instrument. The product-type may correspond to a "rewards card" or other suitable features of the payment instrument. The TP may impose a surcharge based on specific attributes associated with the brand and/or product-type.

A surcharge attribute may include one or more characteristics of a transaction attribute. A transaction attribute may include one or more features of a surcharge attribute. Exemplary surcharge attributes are listed below in Table 6.

TABLE 6

Illustrative Surcharge Attributes.

| Illustrative Surcharge Attributes |
|---|
| Surcharge fraction |
| Total surcharge amount |
| Fixed fee amount |

TABLE 6-continued

Illustrative Surcharge Attributes.
Illustrative Surcharge Attributes

Payment instrument
Payment instrument product type
Merchant category code
Product stock keeping unit ("SKU")
Transaction network
Issuer
Surcharge imposition start time
Surcharge imposition end time
Transaction location
Transaction time Point-of-Sale ("POS") Controller Apparatus may include one or more non-transitory computer-readable media. The media may store computer-executable instructions. The computer-executable instructions, when executed by a processor on a computer system, may perform a method for adjusting a transaction cost.

The method may include imposing a surcharge on a plurality of transactions. The surcharge may be imposed during a pre-determined time period. The plurality of transactions may be associated with a payment instrument. The plurality transactions may correspond to a plurality of transaction records.

The method may include determining a change in a performance metric. The performance metric may be any suitable performance metric. Table 7 lists illustrative performance metrics.

TABLE 7

Illustrative performance metrics.
Illustrative Performance Metrics

Checkout queue length
Items scanned per minute
Transaction processing rate
Ingress rate into merchant location
Egress rate out of merchant location
Time between ingress and egress
Number of items purchased per transaction
Transaction volume (number)
Transaction volume ($)
Transaction frequency (per item/per unit of time)
Transaction frequency (per sale/per unit of time)
Total sales
Sales per fiscal period
Number of credit card purchases
Number of non-credit card purchases
Number of items purchased
Cost/price per item purchased
Same store sales
Customer characteristics A change in the performance metric may be correlated to a surcharge. Imposing the surcharge on a plurality of transactions may be correlated to an effect on one or more of the transaction participants. Imposing the surcharge may be correlated to an effect on any suitable party or parties. The parties may be third parties to a transaction. The change in the performance metric may correspond to a change in profitability or revenue. The change in the performance metric may include a change in transaction volume, revenue, gross/net profit, number of items sold or any suitable indicator of profitability.

The change in the performance metric may correspond to a change in a purchasing behavior of a customer. For example, when a surcharge is imposed on credit card transactions, the customer may avoid using a credit card to pay for a purchase.

When a surcharge is imposed at a merchant location associated with a merchant category code ("MCC"), the customer may avoid making a purchase at the merchant location associated with the MCC at least in part because of the imposition of the surcharge. In response to imposition of a surcharge, a customer may increase use of alternative payment instruments. A surcharge may not be imposed on payments made using the alternative payment instruments. The alternative payment instrument may be associated with a lower surcharge than a surcharge associated with a credit card transaction.

The change in the performance metric may be detected by comparing a first performance metric quantity to a second performance metric quantity. The first performance metric quantity and the second performance metric quantity may each be associated with the performance metric.

Illustrative performance metrics and associated performance metric quantities are shown below in Table 8.

TABLE 8

Illustrative performance metrics and effects.

| Performance Metric | Performance Metric Change |
| --- | --- |
| Transaction volume | Rate of change |
|  | Daily volume |
|  | Volume per item |
|  | Volume at specified time |
|  | Volume at specified locations |
|  | Number of items sold per transaction |
| Revenue | Daily/hourly revenue |
|  | Quarterly earnings |
|  | Profit per item sold |
|  | Profit per transaction |
|  | Surcharge revenue |
|  | Cash revenue |
| Transaction cost | Change in acquirer fees |
|  | Change in network fees |
|  | Change in issuer fees |
|  | Change in transaction cost per item |
|  | Average transaction cost per transaction |
|  | Loss of goodwill (i.e., volume of customer complaints) |
|  | Change in number of transactions authorized/denied |
|  | Change in surcharge implementation costs |
| Checkout queue length | Items scanned per unit of time |
|  | Customer ingress rate |
|  | Customer egress rate |
|  | Transaction processed per unit of time |
|  | Checkout lane availability |

The methods may include receiving a plurality of performance metric quantities. A difference between each of the plurality of performance metric quantities may correspond to a change in a performance metric.

The change in the performance metric may be measured during a pre-determined time period. The method may include adjusting a transaction cost. The transaction cost may be adjusted in response to detection of a change in a performance metric. The transaction cost may be associated with a payment instrument.

For example, the transaction cost may include an interchange fee imposed by an issuer associated with the payment instrument. The transaction cost may include a network fee imposed by a transaction processing network. The issuer and the transaction processing network may provide transaction processing services in exchange for the fees. The transaction cost may include any fee imposed by a transaction participant. The transaction participant may provide any suitable transaction processing service.

The method may include adjusting a transaction cost when a change in the performance metric exceeds a performance metric threshold. The performance metric threshold may correspond to a performance metric quantity. The performance metric threshold may correspond to a set of performance metric quantities.

The method may include determining a surcharge adjustment. The surcharge cost adjustment may be determined based on an adjusting of a transaction cost.

For example, a merchant may impose a surcharge to recover a transaction cost associated with processing a transaction. If the transaction cost is lowered, the merchant may recover the transaction cost by imposing a reduced surcharge.

A plurality of transactions may be a first plurality of transactions. A payment instrument may be a first payment instrument. The method may include imposing a surcharge on a second plurality of transactions. The second plurality may be associated with a second payment instrument. The second payment instrument may be associated with a transaction cost. The transaction cost may be different from a transaction cost associated with the first plurality of transactions.

The transaction cost associated with the second plurality of transactions may include one or more transactions cost charged to process transactions associated with the second payment instrument. For example, the second payment instrument may be associated with different issuer from the first payment instrument. The issuer associated with the second payment instrument may charge an interchange fee that is larger than an interchange fee charged by an issuer associated with the first payment instrument.

A surcharge may be imposed on the second plurality of transactions. The surcharge may be imposed during a pre-determined time period. The surcharge may be imposed on both the first and second plurality of transactions during one pre-determined time period.

A change in a performance metric may be a first change. The method may include determining a second change in the performance metric. The second change may be determined during the pre-determined time period. The first and second change may be determined during one pre-determined time period.

The method may include comparing a first change in a performance metric to a second change in the performance metric. For example, a first payment instrument may be associated with a higher transaction cost than a second payment instrument. Because of the higher transaction cost, a merchant may impose a larger surcharge on transactions executed using the first payment instrument than on transactions executed using the second payment instrument.

The surcharge imposed on the first payment instrument may be correlated to a decrease in transactions executed using the first payment instrument. The surcharge imposed on the second payment instrument may be correlated to a decrease in transactions executed using the second payment instrument. Because the first payment instrument is associated with a larger surcharge than the second payment instrument, the decrease in transactions executed using the first payment may be larger than the decrease in transactions executed using the second payment instrument.

A transaction cost may be adjusted when a difference between the first change and the second change exceeds a threshold difference. For example, a first payment instrument may be associated with a higher transaction cost than a second payment instrument. A merchant may impose a first surcharge associated with the first payment instrument and a second surcharge associated with the second payment instrument.

The first surcharge may be greater in magnitude than the second surcharge. The first surcharge may be expected to be correlated to a greater decrease in interchange revenue than imposition of the second surcharge. If the second surcharge is correlated to a greater decrease in interchange revenue than the first surcharge, the transaction cost associated with the second payment instrument may be adjusted. The adjustment to the instrument may encourage the merchant to reduce the second surcharge associated with the second payment instrument.

The method may include adjusting the transaction cost associated with the first payment instrument. The method may include adjusting the transaction cost associated with the second payment instrument. The method may include adjusting the transaction cost associated with the first payment instrument and the second payment instrument.

The performance metric may correspond to an amount of interchange revenue associated with the payment instrument. The amount of interchange revenue may be generated by a transaction processing network changing an interchange fee to a merchant. The interchange fee may be charged each time a customer uses the payment instrument to pay the merchant for a purchase. If the merchant imposes a surcharge to recover the interchange fee, the customer may curtail use of the payment instrument. The curtailment of the customer may be correlated to a decrease in interchange revenue collected by the transaction processing network.

The performance metric may correspond to a number of transaction records transmitted from a transaction participant to a transaction processing network. The transaction participant may be a merchant, an acquirer or any suitable transaction participant. A change in the number of transaction transmitted to the transaction processing network may correspond to an increase/decrease in usage of a payment instrument. For example, the increase/decrease in usage may be correlated to waiving/imposing a surcharge for using the payment instrument.

The performance metric may correspond to a difference between a first number of transaction records transmitted from a transaction participant to a first transaction processing network, and a second number of transaction records transmitted from the transaction participant to a second transaction processing network. The first number of transaction records may be transmitted during a pre-determined time period. The second number of transaction records may be transmitted during the pre-determined time period.

The difference between the first number of transaction records and the second number of transaction records may be correlated to different surcharges imposed on transactions associated with the first or second transaction processing networks. Surcharges may differ based on a difference in any suitable surcharge attribute. A first transaction processing network may charge higher network fees than a second transaction processing network. A merchant may impose a greater surcharge on transactions associated with the first transaction processing network. The greater surcharge may discourage more customers from using the first payment instrument than the surcharge associated with the second payment instrument discourages customers from using the second payment instrument.

An adjusting of a transaction cost may include adjusting the transaction cost for transactions that are associated with a geographic region. A transaction may be associated with the geographic region. For example, a customer may purchase an item at a merchant location. The merchant location may be located in geographic region defined by a zip code. The zip may be geographic value. The zip code may be a transaction attribute included in a transaction record. The transaction record may correspond to the customer purchase. A transaction cost may be adjusted for a transaction that includes the zip code in the transaction record.

Adjusting the transaction cost may include adjusting a transaction cost during a threshold time period. For example, a transaction participant may agree to reduce a transaction cost for a trial period of time. If a change in a performance metric indicates that the reduction in the transaction cost is correlated to an increased use of a payment instrument, the transaction participant may extend the trial period of time. The reduction in the transaction cost may be conditioned on a corresponding reduction in an imposed surcharge.

Apparatus may include a point-of-sale ("POS") controller. The POS controller may include a non-transitory computer readable medium. The computer readable medium may include computer readable program code embodied therein.

The POS controller may include a processor. The processor may be configured to execute the computer readable program code. The computer readable program code when executed by the processor may cause the POS controller to perform one or more tasks.

The computer readable program code may cause the POS controller to receive a plurality of transaction records. Each record included in the plurality of transaction records may include a surcharge attribute. Each record included in the plurality of transaction records may include a payment instrument attribute.

A payment instrument attribute may correspond to a transaction processing network, an issuer or any suitable payment instrument attribute. Illustrative payment instrument attributes are shown below in table 9.

TABLE 9

Illustrative payment instrument attributes
Illustrative Payment Instrument Attributes Brand (i.e., issuer, transaction network, acquirer)
Customer name
Expiration date
Card security code ("CSC")
Card verification data ("CVD")
Card verification value ("CVV," "CVV2," "iCVV" or "Dynamic CVV")
Card verification value code ("CVVC")
Card verification code ("CVC" or "CVC2")
Verification code ("V-code")
Card code verification ("CCV")
Signature panel code ("SPC")
Customer identification number ("CID")
Card account number
Affinity
Product (i.e., rewards card, platinum card, signature card, ect.)

The computer readable program code may cause the POS controller to determine a correlation. The correlation may correlate the surcharge attribute, the payment instrument attribute and a change in a performance metric. The correlation may correlate for a given payment attribute, the surcharge attribute and a change in a performance metric.

For example, the correlation may show that when a surcharge fraction is imposed on a plurality of transactions executing using a payment instrument, the frequency with which customer use the payment instrument remains unchanged. The correlation may indicate that imposing the surcharge does not discourage customers from using the payment instrument.

The correlating may be determined using any suitable technique. For example, one or more performance metric quantities may be linearly, or non-linearly, regressed upon a surcharge attribute, modeled on the surcharge attribute, predicted from the surcharge attribute or estimated from the surcharge attribute. The correlating may be performed utilizing a multivariate statistical model or a neural network. The correlating may include determining a correlation coefficient that indicates a degree of correlation between a plurality of performance metric quantities and a plurality of surcharge attributes.

The POS controller may determine a transaction cost directive. The transaction cost directive may be determined based on the correlation. The transaction cost directive may include a request that a transaction cost be adjusted. The transaction cost directive may include a request for a reduction in a transaction cost associated with the payment instrument attribute. The adjustment may be any suitable adjustment.

The POS controller may be configured to transmit the transaction cost directive to a transaction participant. The transaction participant may determine a transaction cost associated with the payment instrument attribute.

For example, a correlation may show that a surcharge attribute is correlated to a decrease in sales at a merchant location. The correlation may suggest that imposing a surcharge at the merchant location is discouraging customers from patronizing the location. To encourage customers to patronize the merchant location, the merchant may submit a transaction cost directive to a transaction processing network. The transaction cost directive may request that the transaction processing network reduce a transaction cost associated with a payment instrument attribute. A reduction in the transaction cost may allow the merchant to reduce the surcharge and thereby encourage customers to patronize the merchant location.

The POS controller may receive a transaction cost adjustment. The transaction cost adjust may be received in response to the transaction cost directive. The POS controller may determine an adjusted surcharge attribute based on the transaction cost adjustment.

For example, if the transaction participant agrees to reduce a transaction cost associated with a payment instrument attribute by 10%, a merchant may reduce a surcharge fraction associated with the payment instrument attribute by 12%. The surcharge fraction, after being reduced by 12%, may correspond to an adjustment to an adjusted surcharge attribute.

The surcharge attribute may correspond to a surcharge fraction. The surcharge attribute may correspond to a fixed fee. The adjusted surcharge attribute may include an adjusted surcharge fraction. The adjusted surcharge attribute may include an adjusted fixed fee.

The plurality of transaction records may be a first plurality of transaction records. The POS controller may impose the adjusted surcharge attribute on a second plurality of transactions. The second plurality of transactions may correspond to a second plurality of transaction records. Each record included in the second plurality of transactions records may include the adjusted surcharge attribute.

The performance metric may correspond to a number of transaction records. The number of transaction records may be transmitted from a transaction participant. The number of transaction records may be transmitted to a transaction processing network. The number of transaction records may be transmitted during a pre-determined period of time. A change in the performance metric may correspond to a change in the number of transactions transmitted. The change in the number of transaction records transmitted may be correlated to imposition of a surcharge.

Apparatus may include an article of manufacture comprising a non-transitory computer usable medium. The non-transitory computer usable medium may have computer readable program code embodied therein. The code, when executed by a processor on a computer system may generate a surcharge directive.

The surcharge directive may include a request that a transaction participant cease imposing a surcharge. The surcharge directive may include a request that a transaction participant adjust a surcharge. The surcharge directive may include a request that a transaction participant adjust any suitable surcharge attribute.

The computer readable program code may cause the computer to measure a change in a first performance metric. The change in the first performance metric may be measured in response to imposing a first surcharge. The computer readable program code may cause the computer to measure a change in a second performance metric. The change in the second performance metric may be measured in response to imposing a second surcharge.

The computer readable program code may cause the computer to generate a surcharge directive based on a change in a performance metric. The computer readable program code may cause the computer to generate a surcharge directive based on a change in the first performance metric. The computer readable program code may cause the computer to generate a surcharge directive based on the change in the second performance metric. The computer readable program code may cause the computer to transmit the surcharge directive to any suitable transaction participant.

For example, a merchant may impose a surcharge on customers that use a branded credit card to pay for a purchase. Following a "roll out" of the surcharge, an issuer may monitor a purchase amount included in each transaction record received from a merchant. An average purchase amount may be a performance metric. A correlation may show that over a pre-determined time period beginning on the "roll out" date, an average purchase amount included in each transaction record received from the merchant has decreased.

The issuer may transmit a surcharge directive to the merchant. The surcharge directive may inform the merchant of the correlation. The surcharge directive may advise the merchant of the negative effect of the surcharge on average purchase amount. The surcharge directive may advise the merchant to adjust or waive the surcharge.

The surcharge directive may be generated based on a first change in a performance metric and a second change in a performance metric. The first change may be correlated to an imposition of a first surcharge. The second change may be correlated to an imposition of a second surcharge.

For example, an issuer may monitor a transaction volume associated with a merchant. The transaction volume may correspond to a number of transactions submitted by the merchant to the issuer for authorization and/or settlement. The issuer may detect that following imposition of a first surcharge, the number of transactions submitted by the merchant decreased by a first amount. The first surcharge may be imposed on a first payment instrument. The number of transactions may correspond to transactions executed using the first payment instrument.

The decrease may be detected based on comparing a transaction volume submitted by the merchant during one or more pre-determined historical time periods. The first amount may correspond to a first change in a performance metric. The first change in the performance metric may correspond to a first payment instrument.

The merchant may impose a second surcharge. The second surcharge may be greater than the first surcharge. The second surcharge may be imposed on a second payment instrument. The issuer may detect that following imposition of the second surcharge, the number of transactions submitted by the merchant decreased by a second amount. The number of transactions may correspond to transactions executed using the second payment instrument. The second amount may be greater than the first amount. The second amount may be disproportionally greater than the proportional increase in the first surcharge. The second amount may correspond to a second change in the performance metric.

In response to detection of the second amount, the issuer may transmit a surcharge directive to the merchant. The surcharge directive may inform the merchant of the disproportional decrease in transaction volume correlated to imposition of the second surcharge. The surcharge directive may advise the merchant to revert to the first surcharge. The surcharge directive may inform the merchant that if the merchant does not revert to imposition of the first surcharge, the merchant's transaction cost may be increased.

The computer readable program code may cause the computer to receive a withdrawal notice. The withdrawal notice may be received in response to the surcharge directive. The withdrawal notice may indicate that a transaction participant is withdrawing a surcharge. The withdrawal notice may indicate that a transaction participant may cease imposing a surcharge on a transaction associated with a payment instrument. The withdrawal notice may indicate that beginning at a specified time, the merchant may cease imposing a surcharge.

The computer readable program code may cause the computer to determine a transaction cost adjustment. The transaction cost adjustment may be determined based on a change in a performance metric. The change may be a change in a first performance metric. The change may be a change in a second performance metric. For example, a transaction participant may offer to lower a merchant's transaction cost if the merchant lowers a surcharge. A lower surcharge may be correlated with a change in a performance metric, such as change in interchange revenue. A lower surcharge may allow a transaction participant to realize a threshold level of interchange revenue.

The computer readable program code may cause the computer to transmit the transaction cost adjustment and the surcharge directive to a transaction participant. The computer readable program code may cause the computer to receive a surcharge adjustment notice from the transaction participant. The surcharge adjustment notice may inform a transaction participant of an adjustment to one or more surcharge attributes.

In response to the surcharge directive a transaction participant may receive a transaction cost directive. In response to the transaction cost directive, a transaction cost may be adjusted. For example, in response to receiving a surcharge directive asking a merchant to lower a surcharge, the merchant may request that the transmitter of the surcharge directive lower a transaction cost.

An adjustment to a transaction cost may be proportional to adjustment to a surcharge. An adjustment to a transaction cost may be disproportional to an adjustment to a surcharge. An adjustment to a transaction cost may be determined independent of an adjustment to a surcharge. An adjustment to a surcharge may be determined independent of an adjustment to a transaction cost.

The computer readable program code may cause the computer to identify a surcharge violation. The surcharge violation may be associated with a surcharge imposed by a merchant. The surcharge violation may be associated with a surcharge correlated to a change in a performance metric. A violation notice may be transmitted to a transaction participant. The surcharge violation notice may be transmitted in response to a transaction cost directive. The surcharge violation notice may be included in a surcharge directive.

The surcharge violation may correspond to an imposed surcharge that does not follow a surcharge rule. The surcharge rule may be one of a set of surcharge rules.

The surcharge rule may be set by a TP, such as a transaction processing network. For example, the surcharge rule may state that all payment instruments accepted by a merchant must be identically surcharged. The surcharge rule may state that credit card transactions may only be surcharged in the same manner as a debit card transaction. The surcharge rule may state that an imposed surcharge not exceed a transaction cost associated with a payment instrument used in the transaction. The surcharge rule may be any suitable surcharge rule.

The surcharge rule may be set by a government or a government agency. For example, a state may pass a law that forbids imposing a surcharge on credit card transactions. The surcharge violation may correspond to a surcharge being imposed on a credit card transaction in the state. A federal government may pass a law that forbids imposing a surcharge on a debit card transaction.

The computer readable program code may cause the computer to receive a suspension notice from the transaction participant. The suspension notice may be transmitted in response to a rejection of a transaction cost directive. The suspension notice may be transmitted in response to receiving a surcharge directive.

The suspension notice may indicate that the transaction participant will no longer accept a payment instrument to pay for a purchase. In response to receiving a suspension notice the transaction participant may be disconnected from a transaction processing network. After being disconnected the transaction participant may be unable to submit transactions or transaction records to a transaction processing network.

A transaction participant may disconnect from a transaction processing network with respect to processing transactions executed using a first payment instrument. The transaction participant may remain connected to the transaction processing network with respect to processing transactions executed using a second payment instrument. The first and second payment instruments may be associated with different transaction costs.

Surcharge Adverse Sensitivity Calculator

Apparatus may include a surcharge sensitivity calculator. The calculator may include a non-transitory computer usable medium. The computer readable medium may include computer readable program code embodied therein.

The surcharge calculator may include a processor. The processor may be configured to execute the computer readable program code. The code when executed by the processor may calculate a surcharge sensitivity.

The surcharge sensitivity may capture a sensitivity of a performance metric to an imposition of the surcharge. The sensitivity may be derived from historical transaction data by correlating a transaction attribute to a performance metric.

The surcharge sensitivity may be derived from a performance metric. The surcharge sensitivity may be derived from a change in a performance metric. The surcharge sensitivity may be derived from the performance metric quantities.

For example, an acquirer may obtain transaction receipts from a plurality of merchants. Each of the merchants may be associated with the MCC. The MCC may group merchants that proffer similar or related products. The transaction receipts may correspond to credit card transactions processed by the merchant. The MCC may group merchants that provide similar or related products.

Each merchant associated with the MCC may impose a surcharge schedule. Each surcharge schedule may be different. Each merchant may be located in a distinct geographic location. The acquirer may wish to gauge how imposition of the surcharge may affect sales at one or more merchants associated with the MCC. Based on historical transaction data associated with the MCC, the surcharge sensitivity may be derived. The surcharge sensitivity may capture a sensitivity of sales volume to an imposition of the surcharge.

The sensitivity may be derived from historical transaction data by correlating a transaction attribute to a change in a performance metric. The transaction attribute may include a surcharge attribute, geographic value, a temporal value or any suitable transaction attribute. Illustrative transaction attributes are shown above in table 5.

The sensitivity may be a slope or any suitable suite of constants through which a change in a performance metric is correlated to a surcharge. The correlation between the change in a performance metric and a surcharge may be established using any suitable technique. For example, the change in the performance metric may be linearly, or non-linearly, regressed upon the surcharge, modeled on the surcharge, predicted from the surcharge or estimated from the surcharge. The correlation may be established utilizing a multivariate statistical model or a neural network.

The surcharge sensitivity may correspond to a correlation coefficient. The correlation coefficient may link a change in a performance metric to a surcharge. The correlation coefficient may correspond to a function that links the change in the performance metric to the surcharge. For example, a correlation coefficient may correspond to a ratio of 2:1.5.

The ratio may represent a relationship between the change in the performance metric and the surcharge. The ratio may represent that when the surcharge increases by a factor of 1.2, the performance metric will change by a factor of 2. As a further example, if a merchant increases a surcharge by 1.5%, a number of surcharged transactions conducted by the merchant may decrease by 2%.

The computer readable program code in the surcharge sensitivity calculator may include computer readable program code for causing the calculator to impose a surcharge. The surcharge may be imposed on a plurality of transactions. Each transaction included in the plurality may correspond to a transaction record. The surcharge may be imposed during a pre-determined period of time.

The computer readable program code may cause the calculator to measure a surcharge sensitivity. The surcharge sensitivity may correspond to a sensitivity of a performance metric to a surcharge. The surcharge sensitivity may correspond to a sensitivity of the performance metric to imposing the surcharge during the pre-determined period of time.

The sensitivity of the performance metric may correspond to a change in a performance metric during a time period when the surcharge is imposed. The sensitivity of the performance metric in response to imposing the surcharge may be calculated based on a correlation. The correlation may link a change in the performance metric to an imposition of the surcharge.

A performance metric may correspond to a ratio. The ratio may be a ratio of a first number of debit card transactions to a second number of credit card transactions. The first number of debit card transactions may be transmitted to a transaction processing network from a transaction participant during the pre-determined time period. The second number of credit card transactions may be transmitted to the transaction processing network from the transaction participant during the pre-determined time period.

A performance metric may correspond to a difference between a first number of transaction records and a second number of transaction records. The first number of transaction records may be transmitted to a transaction processing network from a first location. The second number of transaction records may be transmitted to the transaction processing network from a second location. A change in the difference between the first number and the second number may correspond to a change in the performance metric.

For example, historically, each month a merchant may transmit a first number of transaction records to transaction processing network A. Historically, each month the merchant may historical transmit a second number of transaction record to transaction processing network B. One month, the merchant may impose a surcharge on transactions submitted to transaction processing network B. Each surcharged transaction may correspond to a transaction record.

Following imposition on the surcharge, the surcharge sensitivity calculator may determine that the number of transactions submitted to transaction network B during the one month sharply declined from typical historical values. The sharp decline in the number of transaction submitted to transaction processing network B may indicate that transactions associated with transaction network B are highly sensitive to the surcharge.

Based on the surcharge sensitivity, the merchant may adjust the surcharge. The adjustment may correspond to reduction in the surcharge. After reducing the surcharge, the merchant may determine the sensitivity of transactions submitted to transaction processing network B to the reduced surcharge.

The performance metric may correspond to an average purchase amount. The average purchase amount may be associated with a plurality of transactions. A change in the performance metric may correspond to a change in the average purchase amount.

The calculator may calculate an adjustment to a surcharge. The adjustment may be calculated based on a surcharge sensitivity.

For example, based on a surcharge sensitivity, a transaction participant may be advised that a surcharge of Y may generate more revenue than revenue lost as a result of customers declining to use a credit card subject to the surcharge. Based on the sensitivity, the transaction participant may be advised that an increase of Z in the surcharge may negatively affect overall sales.

The sensitivity may be determined for a geographic location. The geographic location may correspond to a store location.

For example, the geographic value may correspond to a geographic region. The merchant may monitor transaction volume associated with the geographic region. The merchant may monitor how often a product is purchased using a particular payment instrument within a particular zip code. Each transaction associated with the geographic region may correspond to a transaction record that includes a transaction attribute. The transaction attribute may be a geographic value corresponding to the geographic region.

The merchant may monitor how often a product is purchased, using the payment instrument, through an online portal of the merchant. The merchant may monitor how often a product is purchased, using the payment instrument, at a retail location of the merchant. Data collected by the merchant may statistically indicate the effect of the surcharge on sales of the product within the geographic region.

The sensitivity may be determined for a temporal value. For example, the sensitivity may indicate that during a time of day, such as "rush hour," customers are less sensitive to an imposition of a surcharge.

The computer readable program code may cause the calculator to normalize a surcharge sensitivity. The surcharge sensitivity may be normalized based on demographic data. The demographic data may be associated with a geographic value. The geographic values may correspond to a geographic location. The geographic value may be a transaction attribute. The geographic value may be included in one or more transactions conducted within a geographic region.

The demographic data may be associated with a first geographic value. The first geographic value may be included in a plurality of transactions processed during a pre-determined period of time.

For example, the first geographic value may correspond to suburbs within a ten mile radius of a city. A surcharge sensitivity calculated for the suburbs may be normalized based on demographic data associated with the region. The normalized surcharge sensitivity may be used to determine an effect of imposing a surcharge in suburbs within a 20 mile radius of the city. Based on an estimated effect of the surcharge, a surcharge adjustment may be determined for a geographic region.

For example, based on normalizing a surcharge sensitivity, a merchant may impose different surcharges depending on where a transaction is executed. Each of the different surcharges may be determined based on normalizing the surcharge sensitivity for a different geographic region.

The demographic data may be associated with a range of temporal values. The range of temporal values may correspond to a period of time. The range of temporal values may be associated with a plurality of transactions processed during the pre-determined period of time.

For example the range of temporal values may correspond to a "holiday shopping season." Following a "roll out" of a surcharge, a merchant may monitor a transaction volume associated with proposed or executed transactions that include a temporal value corresponding to a time period, such as the "holiday shopping season."

The transaction volume may be the performance metric. A duration of the "holiday shopping season" may be the range of temporal values. The merchant may monitor how often a product is purchased using an affinity branded credit card during the holiday shopping season. Data collected by the merchant may indicate a change in transaction volume during the holiday shopping season. The change may be correlated to the surcharge imposed during the holiday shopping season. The correlation may correspond to a surcharge sensitivity. The surcharge sensitivity may relate a transaction volume to the imposed surcharge. The surcharge sensitivity may be used to predict, during the holiday shopping season, customer reaction to the imposed surcharge.

The surcharge sensitivity calculated during the holiday shopping season may be normalized. The normalized surcharge sensitivity may be used to estimate a correlation between an imposed surcharge and a change in a performance metric during a different range of temporal values. For example, the normalized surcharge sensitivity may be used to determine a sensitivity of transaction volume to the surcharge during a holiday weekend.

Based on a normalizing of a surcharge sensitivity, a surcharge adjustment may be determined for a geographic region and a range of temporal values.

Apparatus may include an article of manufacture comprising a non-transitory computer usable medium having computer readable program code embodied therein. The code when executed by a processor on a computer system may determine a surcharge.

The computer readable program code may cause the computer to impose a first surcharge amount on a first plurality of transactions. The computer readable program code may cause the computer to impose a second surcharge amount on a second plurality of transactions. The computer readable program code may cause the computer to correlate a first change in a performance metric to imposing the first surcharge amount. The second surcharge amount may be less than the first surcharge amount. The second surcharge amount may be greater than the first surcharge amount.

The computer readable program code may cause the computer to correlate a second change in the performance metric to imposing the second surcharge amount. The computer readable program code may cause the computer to determine a difference between the first change in the performance metric and the second change in the performance metric. The computer readable program code may cause the computer to determine a third surcharge amount based on the difference between the first change and the second change.

The third surcharge amount may be greater than the second surcharge amount. The third surcharge amount may be equal to the second surcharge amount or the first surcharge amount. The third surcharge amount may be an average of the first and second surcharge amounts. The third surcharge amount may be any suitable surcharge amount.

For example, a transaction participant, such as a merchant may impose a first surcharge amount on transactions conducted during a first time period. During the first time period the merchant may process a first number of surcharged transactions. The first number of surcharged transactions may correspond to a decrease in revenue collected by the merchant. The decrease in revenue may be correlated to imposition of the first surcharge amount. Customers may refrain from patronizing the merchant because the merchant imposes the first surcharge amount.

In response to the decrease in revenue collection, the merchant may adjust the first surcharge. The adjustment may correspond to a second surcharge amount. The merchant may impose the second surcharge amount on transactions conducted during a second period of time. The second period may have the same duration as the first time period. During the second time period the merchant may process a second number of surcharged transactions. The second number of surcharged transaction may correspond to an increase in revenue collected by the merchant. The increase in revenue may be correlated to imposition of the second surcharge amount. The increased revenue may be correlated to offsetting a transaction cost associated with the surcharged transactions. The second surcharge may not discourage as many customers from patronizing the merchant as the first surcharge.

The second number of surcharged transactions may correspond to a decrease in revenue collected by the merchant. The decrease in revenue may be correlated to imposition of the second surcharge amount. Customers may refrain from patronizing the merchant because the merchant imposes the second surcharge amount.

In response to the decrease in revenue collection, the merchant may adjust the second surcharge. The adjustment may correspond to a third surcharge amount.

A first plurality of transactions may correspond to a first plurality of transaction records. The first plurality of transaction records may include a first random distribution of surcharge fractions. The first plurality of transaction records may include a first random distribution of purchase amounts. Each transaction included in the first plurality may include a first surcharge amount.

More specifically, each transaction record in the first plurality of transaction records may include an identical first surcharge amount. The first plurality of transaction records may be identified in real time as a transaction is processed. The first plurality may be extracted from a database of historical transaction records. A transaction record may be included in the first plurality based on whether a transaction record includes the first surcharge amount.

For example, a first transaction record may include a purchase amount of $10 and a surcharge fraction of 2%. The surcharge amount associated with the first transaction record may correspond to 0.20¢. A second transaction record may include a purchase amount of $100 and a fixed surcharge of 0.20¢. Both transaction records may be included in the first plurality because they both include a first surcharge amount of 0.20¢.

A second plurality of transactions may correspond to a second plurality of transaction records. The second plurality of transaction records may include a second random distribution of surcharge fractions. The second plurality of transaction records may include a second random distribution of purchase amounts. Each transaction record included in the second plurality of transaction records may include a second surcharge amount. A transaction record may be included in the second plurality based on whether a transaction record includes the second surcharge amount.

The computer readable program code may cause the computer to correlate a first change in a performance metric to imposition of the first surcharge amount. The correlation may link the first surcharge amount and a change in a performance metric.

For example, as discussed above, each transaction may be associated with different purchase amounts or different surcharge attributes. Nonetheless, each transaction is associated with an identical surcharge amount.

The computer readable program code may cause the computer to correlate a second change in a performance metric to imposition of a second surcharge amount. The correlation may provide a relationship between a second surcharge amount and a second change in a performance metric.

In some embodiments, the correlation may provide a relationship between a surcharge amount and a change in a performance metric irrespective of other transaction attributes that may be associated with each transaction in a plurality of transactions.

In some embodiments, the correlation may identify a pattern in one or more transaction attributes associated with a transaction. For example, the performance metric may correspond to an average purchase amount per transaction. The change in the performance metric may correspond to a change in the average purchase amount associated with each transaction.

A first change in the average purchase amount may be correlated to a first surcharge amount. For example, in a first plurality of transactions that include the first surcharge amount, an average purchase amount may be $45. A merchant may lower the first surcharge. The lower surcharge may correspond to a second surcharge amount. A lower surcharge may encourage additional transactions that include lower purchase amounts.

The lower surcharge may correspond to a second surcharge that represents a smaller portion of the lower purchase amounts. A second change in the average purchase amount may be correlated to the second surcharge amount. A difference between a first change and a second change may indicate that when a surcharge is less than a threshold portion of a purchase amount, customers are not discouraged from paying the surcharge.

A first plurality of transaction records may be transmitted to a transaction processing network. The first plurality of transaction records may be transmitted from a transaction participant. A second plurality of transaction records may be transmitted from the transaction participant. A second plurality of transaction records may be transmitted to the transaction processing network. A first change in a performance metric and a second change in a performance metric may be determined for transactions processed by the transaction network. A first change in a performance metric and a second change in a performance metric may be determined for transactions transmitted by the transaction participant.

A first plurality of transactions may be associated with a first location. A correlation linking a first change in a performance metric to imposition of the first surcharge amount may be specific to the first location. A second plurality of transactions may be associated with a second location. A correlation linking a second change in a performance metric to imposition of the second surcharge amount may be specific to the second location.

A difference between the first change and the second change may indicate a difference in surcharge sensitivity. For example, at the first location, sales may be unaffected by a surcharge amount of $X_1$. However, at the second location, a surcharge amount of $X_2$ may be linked to a decrease in sales at the second location.

Based on a difference between the first change and the second change, a third surcharge may be determined. In the example above a merchant may attempt to impose a surcharge amount of $X_3$. The merchant may determine whether the surcharge amount of $X_3$ is linked to a decrease/increase or to no change in sales at the second location.

The first surcharge amount may equal the second surcharge amount. The first surcharge amount may be different from the second surcharge amount. The first surcharge amount and/or the second surcharge amount may be zero. A difference between a first change in a performance metric and a second change in the performance metric may correspond to a difference between surcharging and not surcharging. The performance metric may correspond to interchange revenue collected by a transaction participant.

The one or more locations may be "brick and mortar" locations, online locations, mobile locations or any suitable location.

For example, a merchant may deploy sales agents at a location. The location may be a trade show, an entertainment event, political rally or other temporary venues. The merchant may process transactions at the temporary venue using a mobile device. The merchant may offer special or promotional pricing scheme at the temporary venue. The promotional pricing may include no surcharging at the temporary venue.

Sales agents at the temporary venue may be equipped with mobile devices. The mobile devices may be configured to process transactions. Each mobile device may correspond to a distinct location. Each location may be associated with a distinct surcharge amount or other surcharge attribute. A first change in a performance metric may be associated with a first mobile location. A second change in a performance metric may be associated with a second location.

Based on a difference between the first change and the second change, a third surcharge amount may be determined. The third surcharge amount may be associated with a third mobile location.

A performance metric may correspond to a frequency of credit card use during a pre-determined time period. A performance metric may correspond to a volume of transactions processed by a transaction participant during a pre-determined time period.

For example, a first surcharge amount may be correlated to a first volume of transaction processed at a first location. A second surcharge amount may be correlated to a second volume of transactions processed at a second location. Based on a difference between the first volume and the second volume, a third surcharge amount may be determined. The third surcharge amount may be imposed at the first location, the second location or a third location.

The third surcharge amount may include a range of surcharge amounts. The computer readable program code may cause the computer to receive a performance metric threshold. The computer readable program code may cause the computer to determine a range of surcharge amounts that corresponds to a set of performance metric quantities. The set of performance metric quantities may be greater than or equal to a performance metric threshold. When the range of surcharge amounts is imposed on a plurality of transactions, a change in the performance metric may correspond to a plurality of performance metric quantities. Each performance metric quantity included in the plurality of performance metric quantities may be included in the set of performance metric quantities.

A first change in a performance metric quantity and/or a second change in a performance metric quantity may correspond to fluctuation of a number of transactions processed per unit of time by a transaction participant during a pre-determined time period. A third surcharge may be determined based on a goal of processing a target number of transactions per unit of time during the pre-determined time period.

Apparatus may include an article of manufacture comprising a non-transitory computer usable medium. The computer usable medium may include computer readable program code embodied therein. The code, when executed by a processor on a computer system, may cause the computer system to measure a surcharge sensitivity.

The computer readable program code may cause the computer system to extract from a database a first plurality of surcharged transaction records. The first plurality may include a first range of purchase amounts. The first plurality may include a surcharge.

The computer readable program code may cause the computer to extract from the database a second plurality of surcharged transaction records. The second plurality may include a second range of purchase amounts. The second plurality may include the surcharge. The surcharge may be equivalent to the surcharge included in the first plurality of transaction records.

Each transaction record in the first plurality and each transaction record in the second plurality may be associated with one transaction processing network.

The computer readable program code may cause the computer to measure a first surcharge sensitivity. The first surcharge sensitivity may measure a sensitivity of a performance metric in response to imposing the surcharge on the first range of purchase amounts. The computer readable program code may cause the computer to measure a second surcharge sensitivity. The second sensitivity may measure a sensitivity of the performance metric in response to imposing the surcharge on the second range of purchase amounts.

The computer readable program code may cause the computer to determine a threshold range of purchase amounts. The threshold range of purchase amounts may be determined based on a difference between the first surcharge sensitivity and the second surcharge sensitivity. The computer readable program code may cause the computer to impose the surcharge on a third plurality of transactions. Imposing the surcharge on the third plurality of transactions may correspond to including the surcharge in a third plurality of surcharged transaction records. The third plurality of transaction records may include the threshold range of purchase amounts.

The computer readable program code may cause the computer to correlate a difference between the first surcharge sensitivity and the second surcharge sensitivity to a difference between a first geographic value and a second geographic value. A threshold range of purchase amounts may be determined based on the correlation.

The first geographic value may be associated with each transaction record included in the first plurality of surcharged transaction records. The second geographic value may be associated with each transaction record included in the second plurality of surcharged transaction records.

A surcharge may be included in a third plurality of surcharged transaction records. Including the surcharge in the third plurality may correspond to imposing the surcharge on a third plurality of transactions. The third plurality may include the threshold range of purchase amounts. The third plurality may include a third geographic value. The third geographic value may correspond to a distance between a region corresponding to the first geographic value and a region corresponding to the second geographic region.

Apparatus may include an article of manufacture comprising a non-transitory computer usable medium. The computer readable medium may include computer readable program code embodied therein. The code when executed by a processor on a computer system may determine a surcharge.

The computer readable program code may cause the computer to extract a plurality of transaction records from a database. Each transaction record in the plurality may include a surcharge amount. The computer readable program code may cause the computer to calculate a correlation between the surcharge amount and a change in a performance metric. The computer readable program code may cause the computer to determine a second surcharge amount based on the correlation.

For example, a performance metric may correspond to a frequency of credit card use during a pre-determined time period. A surcharge amount may be correlated to a decrease in a frequency of credit card use during a pre-determined time period. The decrease may be determined based on a comparison of a number of historical transaction records to a number of transaction records processed during the pre-determined time period. The historical transaction records may correspond to non-surcharged transactions. The transactions processed during the pre-determined time period may correspond to surcharged transactions.

Transaction Cost Recovery for Funds Transfer

One or more non-transitory computer-readable media store computer-executable instructions which, when executed by a processor on a computer system, perform a method for recovering a transaction cost associated with a transfer of funds. The method may include receiving a request from a first customer to transfer an amount of funds to a second customer.

The method may also include identifying a payment instrument from which to draw the funds for the transfer, determining a convenience fee for the transfer, determining a surcharge and charging the amount of funds to the payment instrument in response to confirmation of the transfer. The charging may be associated with a transaction cost. The convenience fee and the surcharge may be charged to an account of the first customer.

The surcharge may include one or more surcharge attributes. Illustrative surcharge attributes are shown above in table 6. The surcharge may be based on the transaction cost. The surcharge may recover all or a portion of the transaction cost. The convenience fee may be charged for providing one or more transaction services. Illustrative transaction services are shown above in table 2.

The method may also include determining the surcharge based on the amount of funds and/or the convenience fee.

The account may be associated with a payment instrument. When the account is associated with a payment instrument, the method may further include determining the convenience fee based on the amount of funds and determining the surcharge based on a payment instrument attribute.

The method may also include receiving a request to transfer the funds to a second account. The second account may be associated with the second customer. The transfer to the second account may be implemented by crediting the account of the second customer a difference between: (1) the amount of funds, and (2) the surcharge.

The surcharge may be determined based on a payment instrument attribute associated with a payment instrument of the first customer and a payment instrument attribute associated with a payment instrument of the second customer. The payment instrument attribute associated with the payment instrument of the first customer may correspond to a first transaction processing network. The payment instrument attribute associated with the payment instrument of the second customer may correspond to a second transaction processing network. Illustrative payment instrument attributes are shown above in table 9.

The surcharge may include a first surcharge and a second surcharge. The method may include charging the first surcharge to an account associated with a payment instrument of the first customer and charging the second surcharge to an account associated with a payment instrument of the second customer.

The first surcharge may be greater in magnitude than the second surcharge.

An embodiment of a method may include receiving a first request from a transferor to transfer the amount of funds from a first payment instrument to an escrow account. The method may further include receiving a second request from a transferee to transfer the amount of funds from the escrow account to a second payment instrument and charging a first account associated with the first payment instrument the amount of funds and a convenience fee. The method may also include crediting the difference between the amount of funds and a surcharge to a second account associated with the second payment instrument.

An embodiment may also include determining the convenience fee based on an attribute of the first payment instrument and determining the surcharge based on an attribute of the second payment instrument.

An embodiment may also include determining the convenience fee based on a geographic location associated with the transferor and determining the surcharge based on a geographic location of the transferee.

The method may also include waiving at least a portion of the surcharge when the amount remains in an escrow account for a pre-determined period of time. The method may also include receiving a third request from the transferee to charge the second account the difference and, in response to the third request, charging the second account the difference and waiving a surcharge associated with the second payment instrument. The surcharge may be waived because the transferee has paid the surcharge in response to the second request.

Another embodiment may relate to a point-of-sale ("POS") controller. The POS controller may include a non-transitory computer readable medium having computer readable program code embodied therein and a processor configured to execute the computer readable program code. The POS controller may be configured to generate and/or receive a transaction record. The POS controller may be configured to identify a credit amount associated with the transaction record and to determine a surcharge.

The surcharge may be based on a payment instrument attribute in the transaction record and a difference between a purchase amount and the credit amount. The credit amount may be an amount of funds transferred to a transferee from a transferor. The amount of funds may be credited to an account associated with a payment instrument of the transferee.

The POS controller may display the surcharge at a POS terminal.

The POS controller may also be configured to determine whether the payment instrument attribute corresponds to a gift card. POS controller may be further configured to waive the surcharge when the payment instrument attribute corresponds to the gift card.

The POS controller may also be configured to determine the surcharge based on a transaction attribute in the transaction record. The transaction attribute may correspond to a geographic location. Illustrative transaction attributes are show above in table 5.

The POS controller may be further configured to determine the surcharge based on a transaction cost associated with the payment instrument attribute and a merchant operating the POS controller.

When the payment instrument attribute corresponds to a gift card, the POS controller may be further configured to determine the surcharge based on a debit card transaction cost.

The POS controller may also be configured to determine the surcharge based on a transaction attribute in the transaction record. The transaction attribute may correspond to a temporal value, such as a time, or times, of day.

In addition, the POS controller may be configured to determine a second surcharge. The second surcharge may be based on a payment instrument attribute in the transaction record and a credit amount. The second surcharge may be imposed to recover all or a portion of a transaction cost associated with the second payment instrument. In such, or other, embodiments, the POS may be configured to display the first surcharge and the second surcharge.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 2:
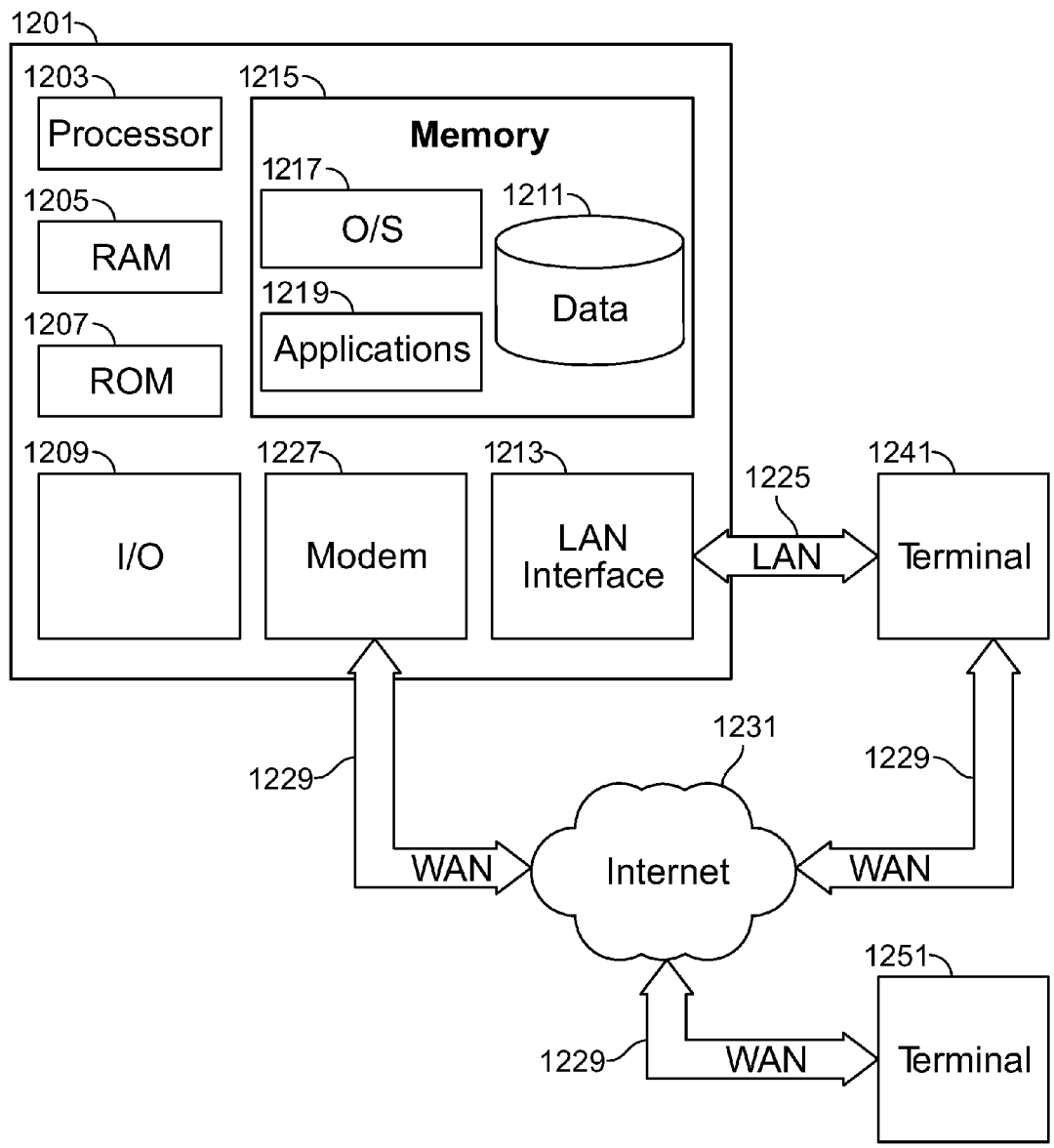
FIG. 2 shows illustrative apparatus in accordance with the principles of the invention.

FIG. 2 is a block diagram that illustrates a generic computing device 201 (alternatively referred to herein as a "server") that may be used according to an illustrative embodiment of the invention. The computer server 201 may have a processor 203 for controlling overall operation of the server and its associated components, including RAM 205, ROM 207, input/output module 209, and memory 215. Server 201 may include one or more receiver modules, server modules and processors that may be configured to receive transaction records, apply surcharge rules, identify surcharge violations, compare values, establish correlations and perform any other suitable tasks related to determining the transaction cost.

Input/output ("I/O") module 209 may include a microphone, keypad, touch screen, and/or stylus through which a user of device 201 may provide input, and may also include one or more of a speaker for providing audio output and a video display device for providing textual, audiovisual and/or graphical output. Software may be stored within memory 215 and/or storage to provide instructions to processor 203 for enabling server 201 to perform various functions. For example, memory 215 may store software used by server 201, such as an operating system 217, application programs 219, and an associated database 211. Alternatively, some or all of server 201 computer executable instructions may be embodied in hardware or firmware (not shown). As described in detail below, database 211 may provide storage for customer information, transaction cost information, transaction records, transaction attributes, surcharge records, inter-merchant proximities, performance metric quantities, merchant information, surcharge rules, payment instrument information and any other suitable information.

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service ("SMS"), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, smart phone, tablet, or any other suitable device for storing, transmitting and/or transporting relevant information.

Any information described above in connection with database 211, and any other suitable information, may be stored in memory 215.

One or more of applications 219 may include one or more algorithms that may be used to receive transaction records, identify surcharge violations, apply surcharge rules, determine inter-merchant proximities, detect inventory levels and perform any other suitable tasks related to determining a transaction cost.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, mobile phones and/or other personal digital assistants ("PDAs"), multiprocessor systems, microprocessor-based systems, set top boxes, tablets, programmable consumer electronics, network PCs, minicomputers, mainframe computers, distributed computing environments that include any of the above systems or devices, and the like. In a distributed computing environment, devices that perform the same or similar function may be viewed as being part of a "module" even if the devices are separate (whether local or remote) from each other.

The invention may be described in the general context of computer-executable instructions, such as program modules, being executed by a computer. Generally, program modules may include routines, programs, objects, components, data structures, etc., that perform particular tasks or store or process data structures, objects and other data types. The invention may also be practiced in distributed computing environments where tasks are performed by separate (local or remote) processing devices that are linked through a communications network. In a distributed computing environment, program modules may be located in both local and remote computer storage media including memory storage devices.

Figure 3:
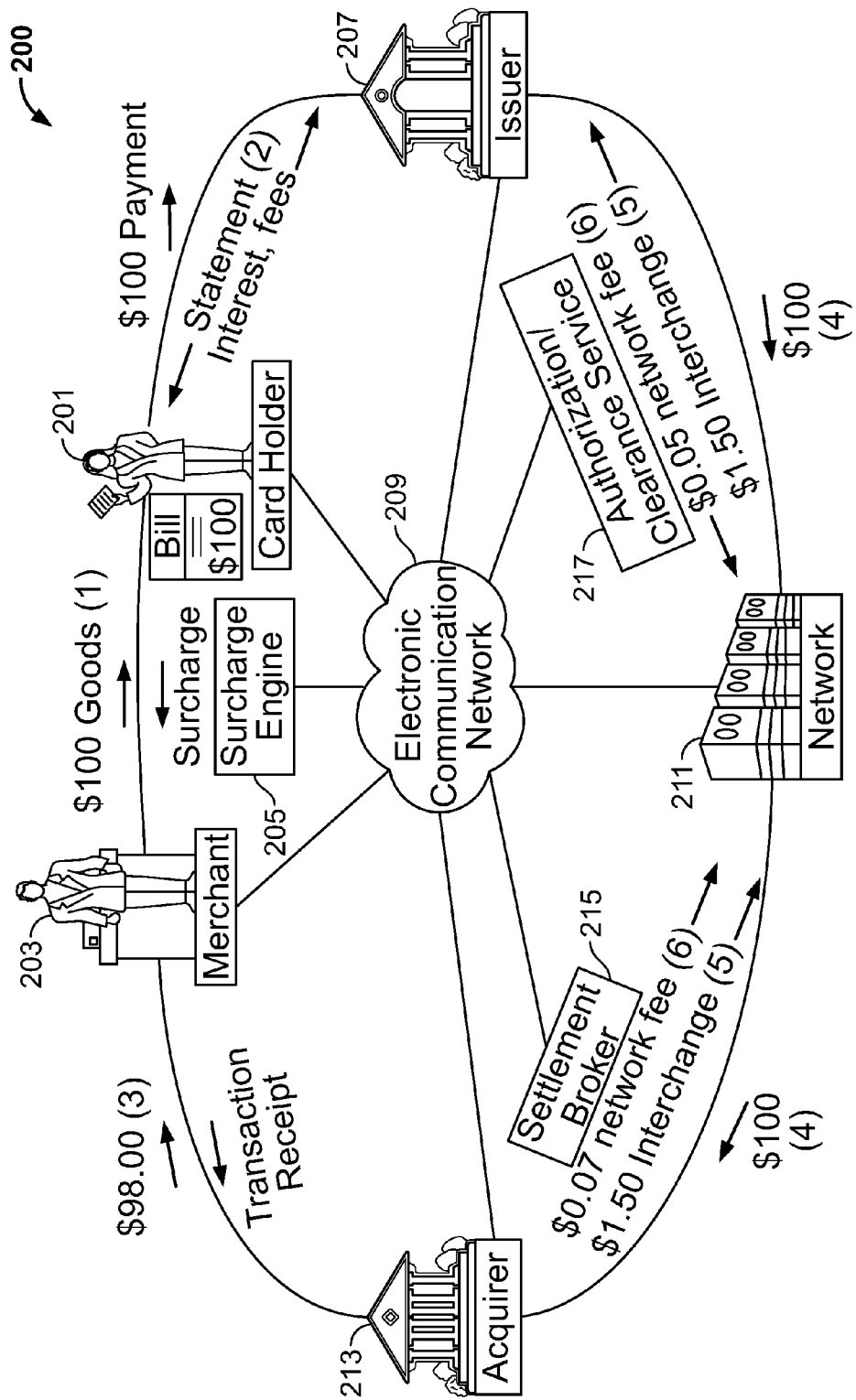
FIG. 3 shows an illustrative arrangement in which apparatus and methods in accordance with the principles of the invention may be used.

FIG. 3 shows illustrative credit card transaction settlement flow 300.

At step 1 card holder 301 may offer a payment instrument, such as a credit card, as payment for $100 of goods sold by merchant 303. Card holder 301 may present information associated with the credit card at the merchant's point-of-sale terminal (not shown). The information may be presented via the payment instrument, a loyalty card or any other suitable device or method.

Based on the information presented by card holder 301, surcharge engine 305 may determine an offset amount. The surcharge engine may determine one or more surcharge attributes. The offset amount may be based on the surcharge fraction.

The offset amount may be added to the $100 price charged by merchant 303. The $100 price may include the offset amount. A total amount may be determined. The total amount may include the price, offset amount, sales tax and any other suitable costs associated with the purchase of the goods.

The information presented by card holder 301, may be transmitted via electronic communication network 309 to transaction network 311. The information may include a transaction record.

Transaction network 311 may receive the information presented by card holder 301 via electronic network 309. Based on the received information, transaction network 311 may transmit an authorization, via electronic communication network 309, to merchant 303. Transaction network 311 may communicate with issuer 307. Transaction network 311 may verify that card holder 301 has not exceeded a credit limit associated with the payment instrument. The authorization may include an indication that the transaction network has approved a charge of the total amount to an account associated with the payment instrument. Authorization services may be provided by a third party such as a transaction broker.

Card holder 301 may acknowledge the total amount. The acknowledgement may include an agreement by card holder 301 to place the charge on the account associated with the payment instrument. The acknowledgement may include a commitment by the card holder to pay the total amount to issuer 307.

At step 2, issuer 307 may prepare a statement for card holder 301. The statement may include the total amount owed to issuer 307. The statement may include interest or other fees owed to issuer 307. Issuer 307 may bear an expense of collecting the total amount, interest and fees from card holder 301. A portion of the transaction cost may flow to issuer 307 to fund collection efforts of issuer 307 and offset a risk of default of card holder 301.

At step 3, merchant 303 may present the acknowledgment of card holder 301 and/or the associated authorization by transaction network 311 to acquirer 313. Acquirer 313 may transfer funds to merchant 303 prior to actual collection, by issuer 307, of the total amount from card holder 301. Acquirer 313 may offer funds to merchant 303 prior to settlement between acquirer 313 and issuer 307.

Acquirer 313 may deduct a merchant discount from an amount of funds transferred to merchant 303. The offset amount determined by surcharge engine 305 may offset, at least in part, the merchant discount paid by merchant 303. The offset amount may correspond to transaction costs charged by transaction network 311. The offset amount may include transaction costs charged by acquirer 313 and issuer 307.

In flow 300, the merchant discount is 2% of the $100 price. Without an offset, merchant 303 receives $98 of the $100 price.

At step 4, acquirer 313 settles the transaction with issuer 307. Acquirer 313 may utilize transaction network 311 to settle the transaction. Acquirer 313 may utilize broker 315 to settle the transaction. Broker 315 may offer settlement services at a lower transaction cost than transaction network 311. Broker 315 may offer the lower transaction costs as a result of aggregating transactions from different acquirers. Each of the aggregated transactions may require settlement between issuer 307 and acquirer 313.

Step 4 shows that at least a portion of the merchant discount flows through transaction network 311 from acquirer 313 to issuer 307. Step 4 also shows that transaction network 311 may receive a network fee from acquirer 313. Step 4 also shows that transaction network 311 receives a network fee from issuer 307. Acquirer 313 and issuer 307 may pay transaction network 311 network fees for facilitating settlement of the transaction.

Table 10 shows net positions of the parties to flow 300.

TABLE 10

Net positions.

| Party | Net ($) |
|---|---|
| Issuer | 1.45 |
| Acquirer | 0.43 |
| Network | 0.12 |
| Merchant | 0 |
| Customer | −2.00 |

Table 11 shows benefits of flow 300 to the transaction participants.

TABLE 11

Illustrative benefits of each transaction participant.

| Party | Benefit |
|---|---|
| Merchant | Access to card holder funds and credit |
| | Timely settlement |
| | Protection from customer fraud and credit risk |
| | Increased purchase price amounts |
| | Payment guaranteed |
| Issuer | Reliable payment platform with broad acceptance |
| | Consistent customer experience across merchants |
| | Predictable source of revenue to support card issuance costs |
| Card holder | Access to ready funds and credit |
| | Ability to make purchases virtually anywhere |
| | Protection from fraud |
| | Protection from merchant disputes |
| | Reward for card based purchases |
| | Does not need to carry cash |
| Transaction Broker | Revenue from trading transaction processing bids |
| | Reliable routing platform |
| | Reducing transaction processing overhead |
| | Access to consumers and suppliers of transaction services |

FIG. 4 shows illustrative transaction record 400. Transaction record 400 may be generated based on transaction information received and/or available at a time of purchase. The transaction record may include point-of-sale ("POS") attributes 401. POS attributes 401 may include transaction information, customer information and merchant information. Exemplary POS attributes 401 may include a date, a time, a check-out lane indicator or any suitable transaction attribute available at a point-of-sale.

Transaction record 400 may include surcharge attributes 403. Exemplary surcharge attributes 403 may include a surcharge amount, maximum surcharge amount, surcharge fraction, transaction cost or other suitable surcharge information.

Transaction record 400 may include synoptic attributes 405. Synoptic attributes 405 may include attributes derived based on other transaction attributes. Synoptic attributes 405 may include attributes derived based on other transaction attributes. The synoptic attributes may be determined based on a pattern detected in a plurality of transaction records. Exemplary synoptic attributes may include a merchant transaction statistic, a market statistic and an issuer statistic. The synoptic attributes 405 may be concatenated to transaction record 400. Synoptic attributes 405 may be concatenated to transaction record 400 after execution of the transaction.

Figure 5:
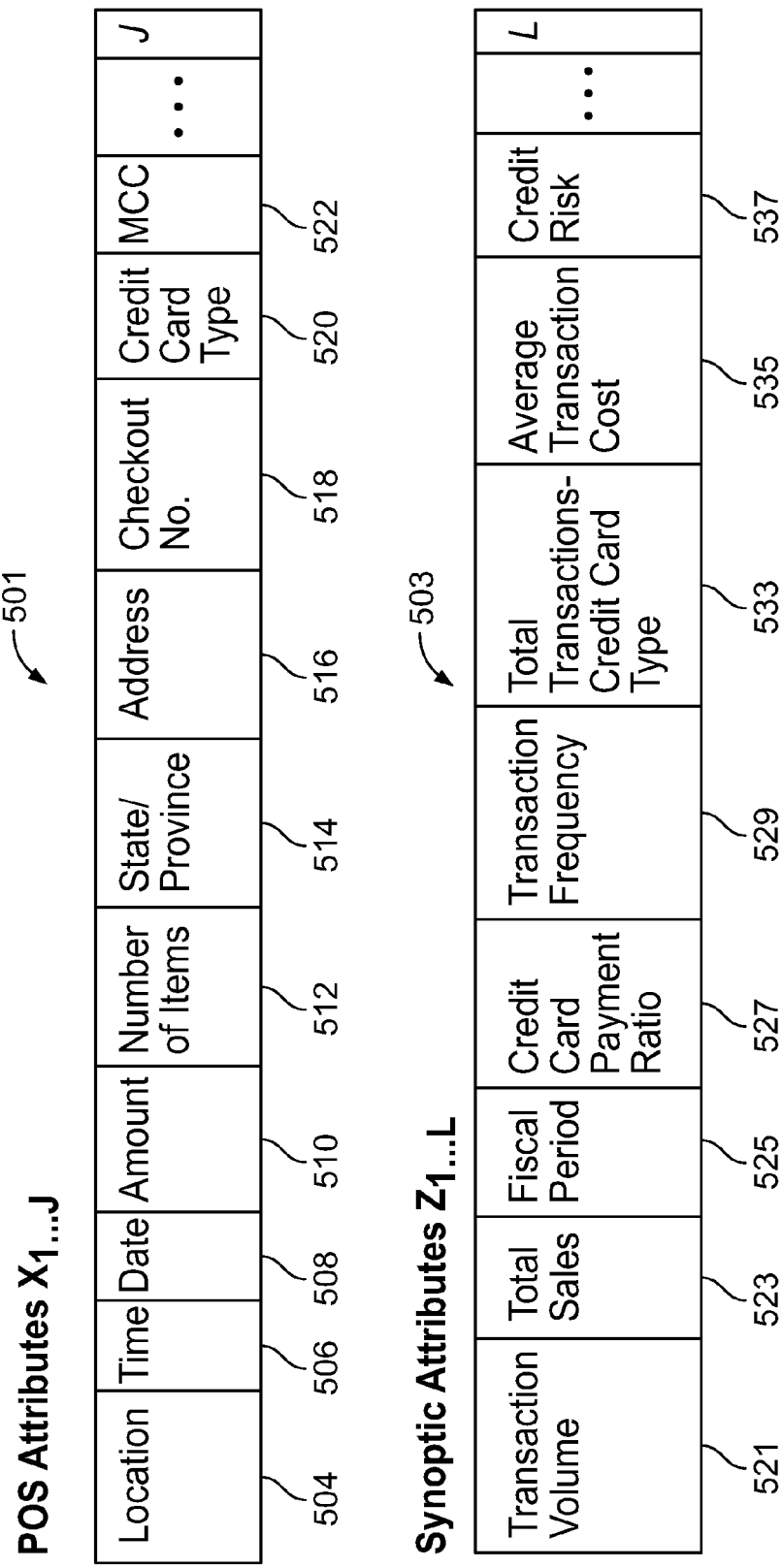
FIG. 5 shows illustrative information in accordance with the principles of the invention.

FIG. 5 shows illustrative POS attributes 501 and illustrative synoptic attributes 503. POS attributes 501 may include location 504. Location 504 may be associated with a POS terminal. Location 504 may be associated with an address. POS attributes 501 may include time 513 and date 508. POS attributes 501 may include amount 510 and number of items 512. Amount 510 may correspond to a price of the product. Number of items 512 may correspond to a number of items purchased by a customer in a transaction.

POS attributes 501 may include state/province 514. State/province 514 may be associated with regulations governing imposition of a surcharge.

POS attributes 501 may include checkout number 518. A merchant may impose a different surcharge at different check-out lines. The merchant may offer no or a reduced surcharge if a self-checkout line is utilized. The self-checkout line may be associated with a checkout number 518.

POS attributes 501 may include credit card type 520. Credit card type 520 may correspond to the payment instrument presented by a customer to pay for a purchase. A surcharge schedule or surcharge amount may be associated with credit card type 520.

POS attributes 501 may include merchant category code ("MCC") 522. MCC 522 may group merchants that supply similar products. Some merchants in MCC 522 may impose a surcharge, while others may not. Merchants within MCC 522 may surcharge at different rates or amounts.

FIG. 5 includes synoptic attributes 503. Synoptic attributes 503 may include transaction volume 521, total sales 523 and fiscal period 525. Fiscal period 525 may be determined based on a time associated with transaction record 1300. Transaction volume 521 and total sales 523 may be associated with fiscal period 525.

For example, transaction records may be sorted by date 508 and location 504. A first number of transaction records may include the month of September and an address on Main Street. The first number may be appended to each transaction record that includes the date in September and the address on Main Street. The first number may correspond to transaction volume 521. The first number may be a synoptic attribute. A second number of transaction records may include a date in the month of August and the address on Main Street. The second number may be a synoptic attribute.

The first number may be compared to the second number. A result of the comparing may be a synoptic attribute. The first number may be concatenated to transaction records that include the date in September. The second number may be concatenated to transaction records that include the date in August. A result of the comparing may be concatenated to transaction records that include either the date in August or the date in September.

Synoptic attributes 503 may include credit card payment ratio 527. Credit card payment ratio 527 may include a comparison of a number of purchases made using a credit card to a number of purchases made using alternative payment methods. The ratio may be computed for a particular merchant, MCC, time/date, location credit card type or other suitable transaction attribute.

Synoptic attributes 503 may include transaction frequency 529, total transactions per credit card type 533 and average transaction cost 535. Average transaction cost 535 may be calculated for a plurality of transaction records.

For example, each transaction record that includes a particular POS attribute, such as a purchase made at location X, may include a variable transaction cost Y. Transaction cost Y may vary based on transaction attributes present in a transaction record. The transaction cost Y may correspond to a surcharge attribute (shown above in Table 4). Average transaction cost 535 may correspond to an average transaction cost associated with location X. Average transaction cost 535 may be appended to each transaction record that includes the attribute corresponding to location X.

Synoptic attributes 503 may include credit risk 537. An issuer may associate each authorized transaction with a credit risk. The issuer may append the credit risk to the transaction record. The credit risk may be determined based on a credit history associated with credit card type 520. The credit risk may be determined based on a credit history associated with the purchasing customer.

Figure 6:
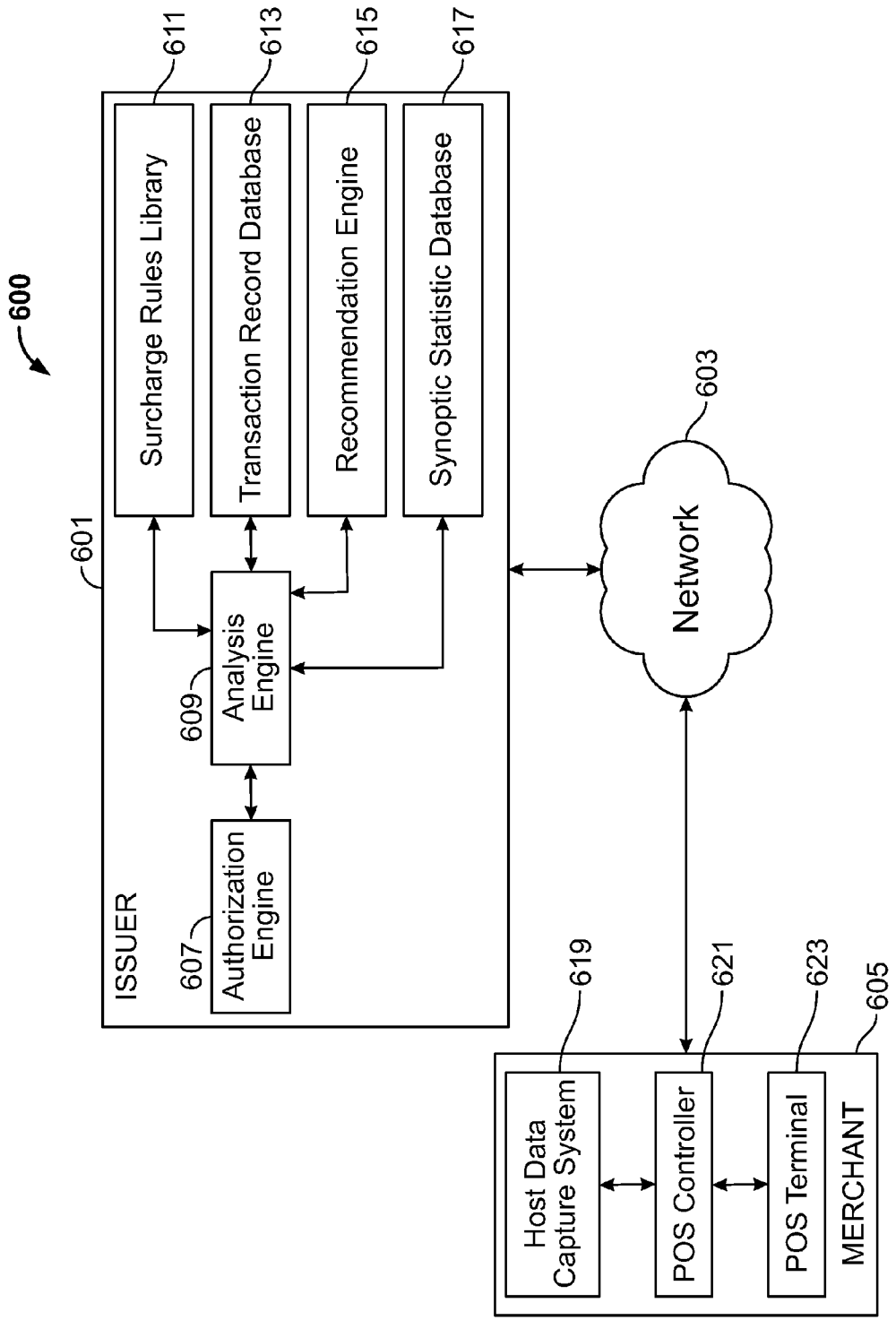
FIG. 6 shows illustrative apparatus in accordance with the principles of the invention.

FIG. 6 shows illustrative system 600. System 600 may include merchant component 605, network component 603 and issuer component 601. In general, a system such as 600 may include many merchant components such as 605, many issuer components such as 601 and many network components such as 603.

A customer may purchase goods by transferring customer information from a personal data storage device, such as a credit card, to point-of-sale ("POS") terminal 623. POS terminal 623 may read the customer information from the card. The card may store data in a magnetic strip, a bar code, a silicon chip or any other suitable data storage device or format. The customer information may include issuer information, account information and any other suitable information.

POS terminal 623 may transmit transaction behavior information to POS controller 621. The transaction behavior information may include some or all of the customer information and any other suitable information, such as the transaction amount, information regarding the purchased goods and/or one or more values corresponding to one or more transaction attributes.

POS controller 621 may act as a server for providing user prompts and display layout information to one or more POS terminals such as POS terminal 605. POS controller 621 may receive transaction behavior information from one or more of the POS terminals.

POS controller 621 may transmit the transaction behavior information to host data capture system 619. Host data capture system 619 may store transaction behavior information from POS controller 621. Host data capture system 619 may store accounting data, inventory data and other suitable data that may be used to identify a transaction behavior.

The transaction behavior information may include merchant information. The merchant information may include information about the merchant, the merchant's business, the merchant's network membership, the merchant's business behavior and any other suitable information. The transaction behavior information may be stored in any suitable element of merchant component 605, network component 603 and issuer component 601.

Host data capture system 619 may create a transaction record based on the transaction information. The transaction record may include some or all of the transaction behavior information. The transaction behavior information may include one or more values that correspond to one or more transaction attributes. POS controller 621 may be configured to determine and/or apply a surcharge. Host data capture system 619 may be configured to determine and/or apply the surcharge. The surcharge may be determined using any suitable component of system 600. The surcharge may be based on the transaction behavior information. The surcharge may be displayed at POS terminal 605.

POS terminal 605 may have one or more interactive features that the customer may use. The features may provide the customer with information that may help the customer decide whether to execute the transaction. The customer may use the features to obtain more information about the merchant, the transaction, the transaction cost, transaction costs associated with different payment instruments (e.g., credit cards, debit cards, instruments or devices that include a contact chip, such as an ISO14443-compliant contactless chip, or other electronic purchasing devices), surcharge or other suitable information.

Host data capture system 619 may route the transaction record to network 603. Network 603 may include a credit card network "processor," which is known to those of ordinary skill in the art. The illustrative systems shown in FIG. 6 may include one or more other processors that perform tasks that are appropriate for the components thereof.

Network 603 may route the transaction record to issuer component 601. Network 603 may include a network operated by an acquirer such acquirer 213 (shown in FIG. 2). Network 603 may include a network operated by transaction processing network 211 (shown in FIG. 2). The routing may be governed by the transaction information. For example, the routing may be governed by a bank issuer number ("BIN") that is encoded in the customer's credit card.

Authorization engine 607 may render a transaction authorization decision based on the transaction record. Authorization engine 607 may route the transaction record to analysis engine 609. Authorization engine 607 may render an authorization decision based on the transaction record. Analysis engine 609 may render a surcharge authorization decision based on the transaction record.

For example, the transaction record may include a surcharge attribute. The transaction record may be routed to surcharge rules library 611. Surcharge rules library 611 may determine whether the surcharge attribute conforms to surcharge imposition rules or regulations governing imposition the surcharge.

Analysis engine 609 may associate the transaction record with a surcharge recommendation. The surcharge recommendation may include a surcharge yield. The surcharge recommendation may recommend an adjustment to the surcharge.

The received transaction record may be routed to recommendation engine 615. Recommendation engine 615 may determine a surcharge recommendation. The surcharge recommendation may be determined based on information stored in transaction record database 613.

Recommendation engine 615 may determine a surcharge yield. Transaction record database 613 may store historical transaction records. The received transaction behavior information may be correlated to information stored in transaction record database 613. The surcharge yield may be determined based on the correlating.

Recommendation engine 615 may determine the surcharge yield based on synoptic statistics 617. Synoptic statistics 617 may include surcharge sensitivity within a particular market or geographic region. Synoptic statistics 617 may include issuer synoptic statistics. Exemplary issuer synoptic statistics may include an effect of the surcharge on revenue of an issuer.

Authorization engine 607 may transmit purchase and surcharge authorization information back to POS terminal 605 through network 603, host data capture system 619 and POS controller 621. The authorization information may include the authorization decision (e.g., "GRANTED" or "DENIED"). The transaction information may be used by network 603 to route the authorization information back to the merchant and the POS terminal where the customer is present.

Figure 7:
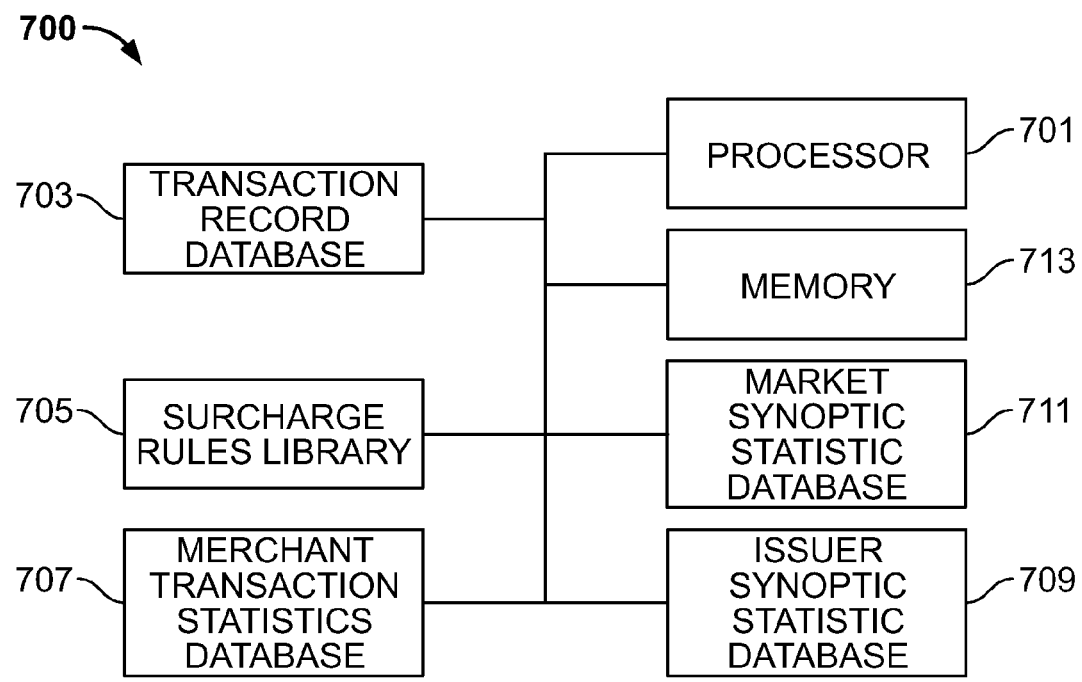
FIG. 7 shows illustrative apparatus in accordance with the principles of the invention.

FIG. 7 shows illustrative system 700. System 700 includes illustrative components for determining the surcharge. System 700 may be included in system 500 (shown in FIG. 5) or system 600 (shown in FIG. 6).

System 700 includes transaction record database 703. Transaction record database 703 may store transaction records. Each stored transaction record may include one or more values. The one or more values may correspond to transaction attributes. Processor 701 may search transaction record database 703 for patterns among the stored transaction records. The patterns may be based on the transaction attributes. The patterns may correspond to a correlation.

Based on the patterns, processor 701 may generate statistics associated with the stored transaction records in database 703. The statistics may include merchant transaction statistics 707. Merchant transaction statistics 707 may include one or more correlations between a performance metric and a transaction attribute. Exemplary merchant transaction statistics 707 may include a correlation between sales volume and recovery amount.

The statistics may include market synoptic statistics 711. Exemplary Market synoptic statistics 711 may include surcharge sensitivity within a particular market or geographic region.

The statistics may include issuer synoptic statistics 709. Exemplary issuer synoptic statistics 709 may include an effect of the surcharge on revenue of an issuer.

Surcharge rules library 705 may include one or more rules for determining the surcharge. Rules library 705 may determine the surcharge for a current transaction. The one or more rules may be based on merchant transaction statistics, market synoptic statistics, issuer synoptic statistics or any suitable statistics.

Figure 8:
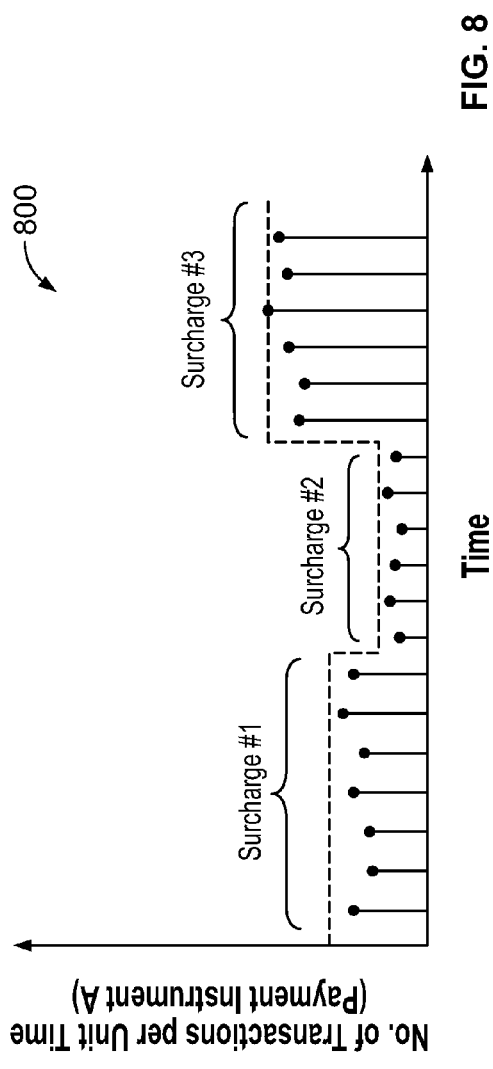
FIG. 8 shows illustrative information in accordance with the principles of the invention.

FIG. 8 shows illustrative information 800. Information 800 shows an effect of a surcharge on a performance metric. Information 800 may correspond to a first effect of a surcharge on a first payment instrument, MCC, transaction processing network or other suitable transaction attribute. Information 800 shows that when surcharge 1 is imposed a number of transactions processed per unit of time are relatively constant.

Information 800 also shows that when the surcharge 1 is changed, there is an effect on the performance metric. Information 800 shows that when surcharge 2 is imposed, the number of transactions processed per unit of time decreases. Surcharge 2 may be larger in magnitude than surcharge 1.

Information 800 shows that when surcharge 3 is imposed, there is a change in the performance metric. When surcharge 3 is imposed, the number of transactions processed per unit of time is greater than number of transactions processed per unit of time when surcharge 1 was in effect.

Figure 9:
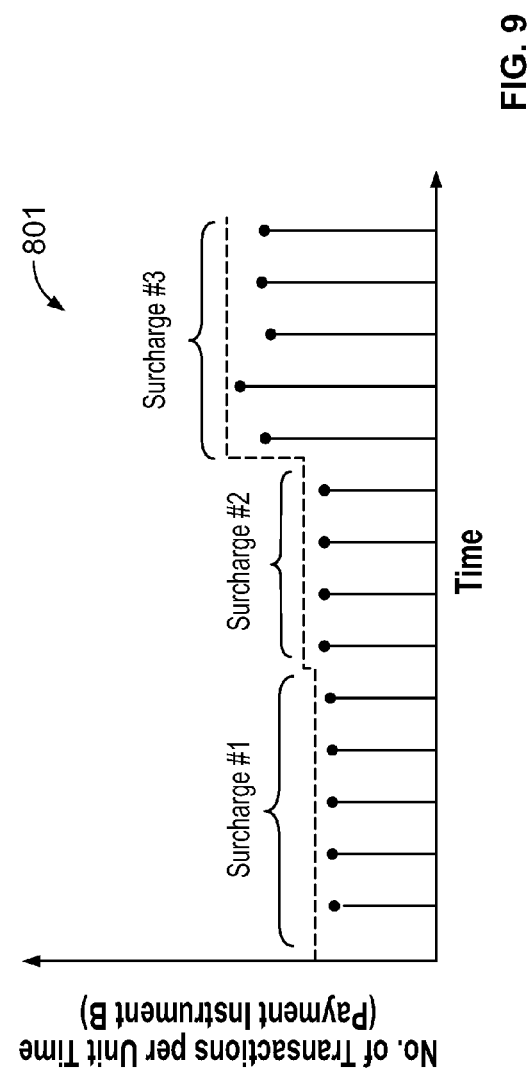
FIG. 9 shows illustrative information in accordance with the principles of the invention.

FIG. 9 shows illustrative information 801. Information 801 shows an effect of a surcharge on a performance metric. Information 801 may correspond to a second effect of a surcharge on a second payment instrument, MCC, transaction processing network or other suitable transaction attribute. Information 801 shows that surcharge 1 and surcharge 2 have a virtually identical effect on the performance metric. Information 801 shows that surcharge 3 does effect the number of transactions processed per unit of time. Surcharge 3 may correspond to a zero surcharge.

The difference between information 800 and information 801 may correspond to a difference between a first effect on a performance metric and a second effect on the performance metric. A difference between the first transaction attribute and the second transaction attribute may explain a difference between the first and second effects.

Figure 10:
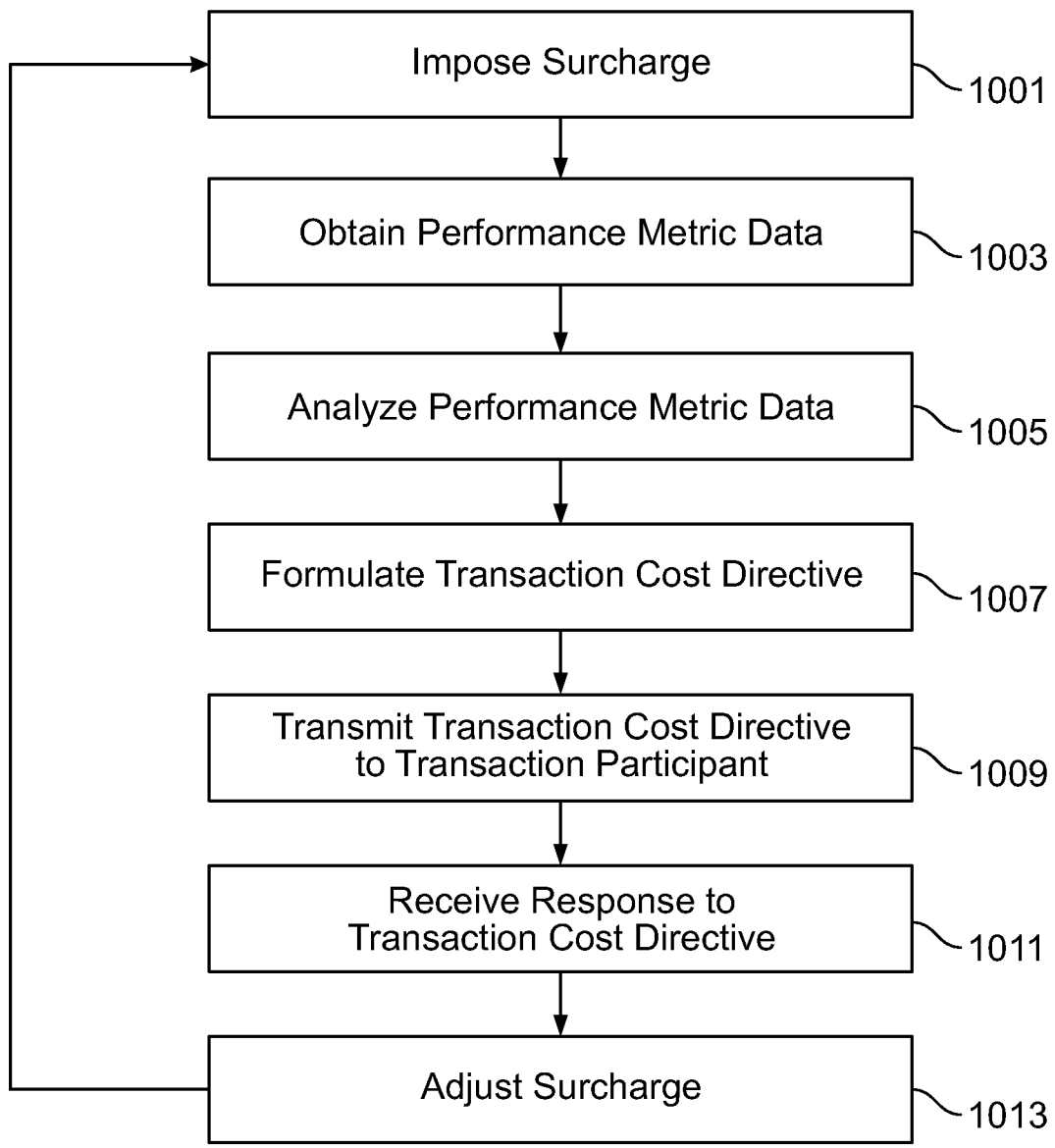
FIG. 10 shows an illustrative process in accordance with the principles of the invention.

FIG. 10 shows illustrative process 1000. Process 1000 may begin at step 1001. At step 1001 surcharge may be imposed. The surcharge may be imposed by a merchant. The surcharge may be imposed on transactions that include a specified transaction attribute. At step 1003, performance metric data may be obtained. The performance metric data may include a change in the performance metric that occurs during a time the surcharge is imposed.

At step 1005 the performance metric data is analyzed. The analysis may include comparing an effect of a first surcharge on the performance metric to an effect of a second surcharge on the performance metric. The analysis may include comparing an effect of a first purchase amount on the performance metric to an effect of a second purchase amount on the performance metric.

At step 1007 a transaction cost mandate may be formulated. The transaction cost mandate may be based on the analysis of the performance metric data. For example, the performance metric data may show that a surcharge effects transaction volume of a first payment instrument more than the surcharge effects transaction volume of a second payment instrument. The transaction cost mandate may request that a transaction cost associated with the first payment instrument be reduced. The reduction in the transaction cost may allow the first surcharge to be reduced.

At step 1009 the transaction cost mandate may be transmitted. The transaction cost mandate may be transmitted to one or more transaction participants. At step 1011, the transaction participant receives the transaction cost mandate. At step 1013, a response to the transaction cost mandate is received. The response may approve the transaction cost mandate or reject the mandate.

At step 1015, the surcharge imposed at step 1001 may be adjusted. The adjustment may correspond to a lowering of the surcharge.

FIG. 11 shows an illustrative transaction cost directive 1100. Directive 1100 includes merchant information 1101. Merchant information 1101 may identify a merchant that transmits the directive. Directive 1100 includes performance metric 1103. Performance metric 1103 may specify a performance metric that is affected by a current transaction cost. Directive 1100 may include surcharge imposed 1107. Surcharge imposed 1107 may correspond to the surcharge being imposed by the merchant identified in merchant information 1101.

Directive 1101 may include effect 1109. Effect 1109 may show how a surcharge imposed 1107 is correlated to a change in performance metric 1103. Directive 1101 shows that for three out of four payment instrument accepted by a merchant the surcharge negatively impacts performance metric 1103.

Directive 1101 may include request 1111 for an adjustment to a transaction cost charged to the merchant identified in 1101. Directive 1101 may include a quid pro quo offer 1113 to reduce surcharge 1107 if the transaction cost is adjusted as requested in 1111.

Figure 12:
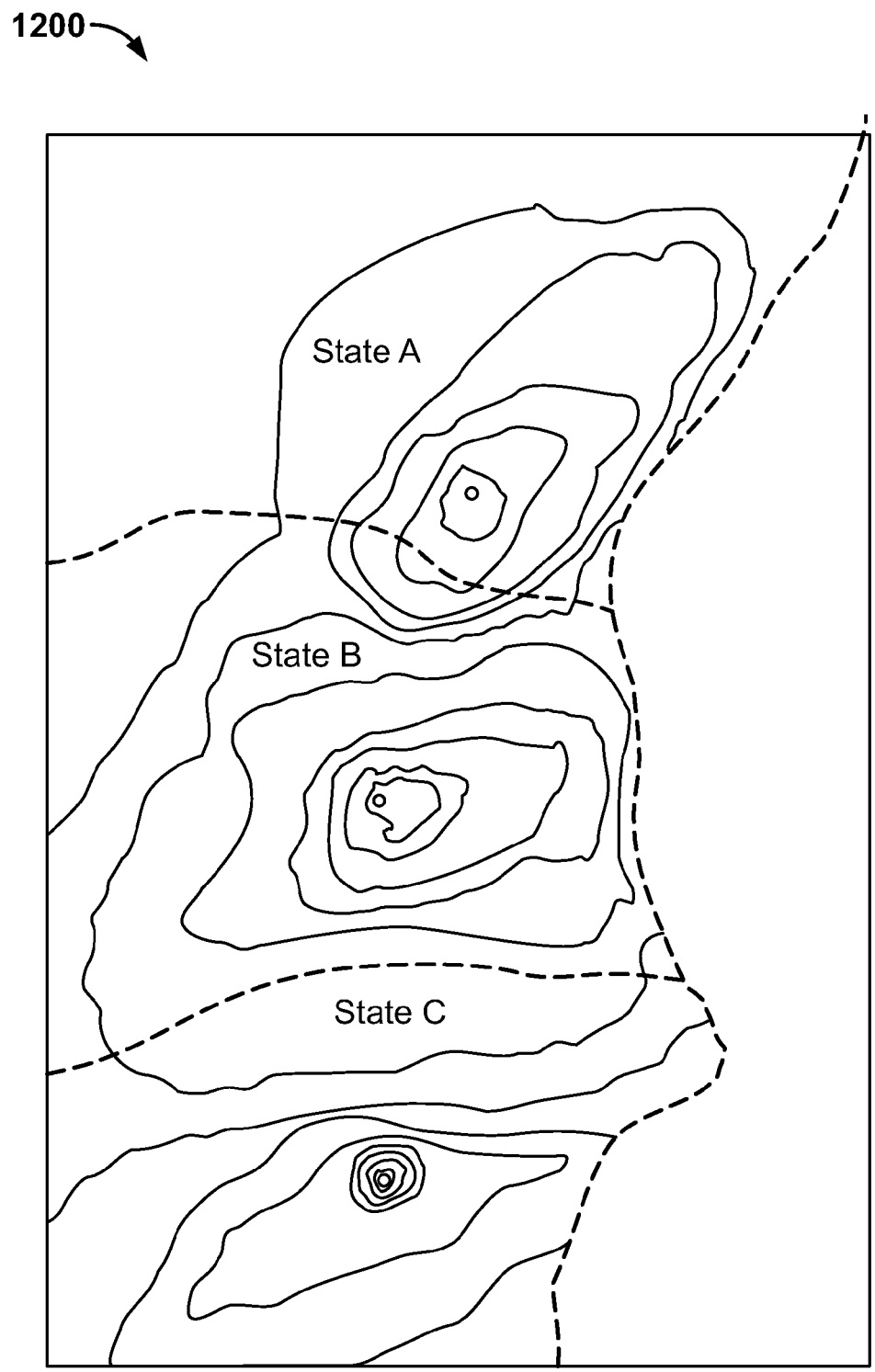
FIG. 12 shows illustrative information in accordance with the principles of the invention.

FIG. 12 shows an illustrative surcharge sensitivity map 1200. Map 1200 shows regions of surcharge sensitivity across states A, B and C. Contour lines that are more closely spaced correspond to a region that exhibits a greater sensitivity to changes in the surcharge. Contour lines that are spaced further apart correspond to regions that exhibit less of a sensitivity to changes in the surcharge.

Map 1200 may be created based on transactions that occur within states A, B and C. Map 1200 may be created based on POS attributes, surcharge attributes and synoptic attributes associated with transaction records generated within states A, B and C. Map 1200 may be created based on comparing transaction records generated within states A, B and C to transaction records generated outside states A, B and C.

Figure 13:
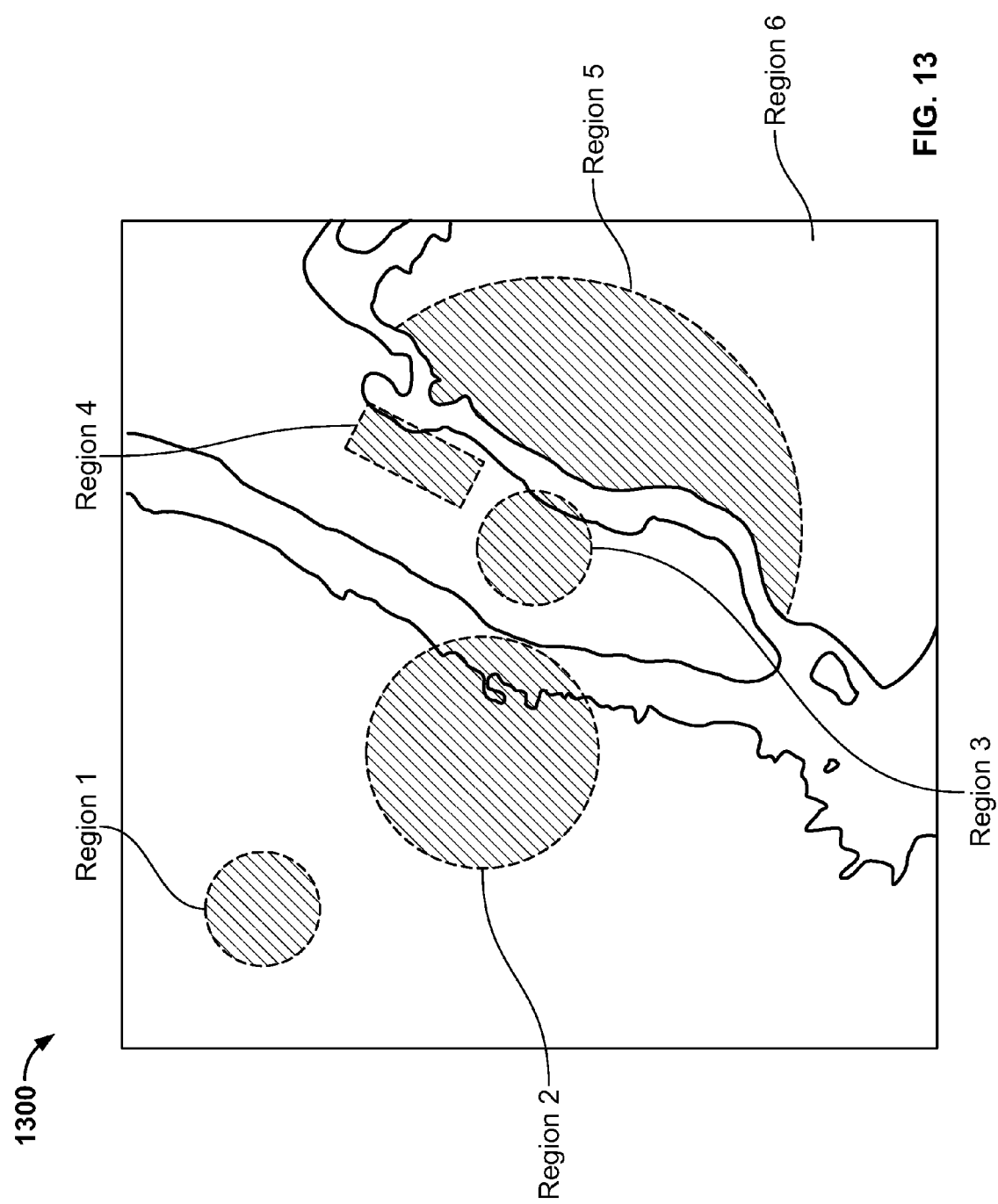
FIG. 13 shows illustrative information in accordance with the principles of the invention.

FIG. 13 shows illustrative information 1300. Information 1300 includes regions 1, 2, 3, 4, 5 and 6. Each region may be associated with a surcharge schedule. Each region may be associated with a surcharge fraction. The associated surcharge fraction may be determined based on characteristic of each region. For example, the associated surcharge fraction may be determined based on transaction records, and attributes contained therein, generated based on transactions that occur within each region.

Each region may be defined by a distance from a point, a geometric shape, natural landmarks or any suitable method of demarcation. An area or size of each region may be determined based on a correlation between one or more attributes of transaction records generated within an encompassing region such as region 6.

For example, each region may be determined based on a distance between a surcharging merchant and a non-surcharging merchant.

As a further example, a performance metric may indicate that customers associated with a first billing address in 2 are less sensitive to the surcharge than customers associated with a billing zip code in region 1. The customers associated with region 1 may be more likely to abstain from making a purchase that will require payment of the surcharge. Customers associated with the region 1 may be more sensitive to the surcharge. Customers associated with region 2 may be less sensitive to the surcharge.

Figures 14A, 14B:
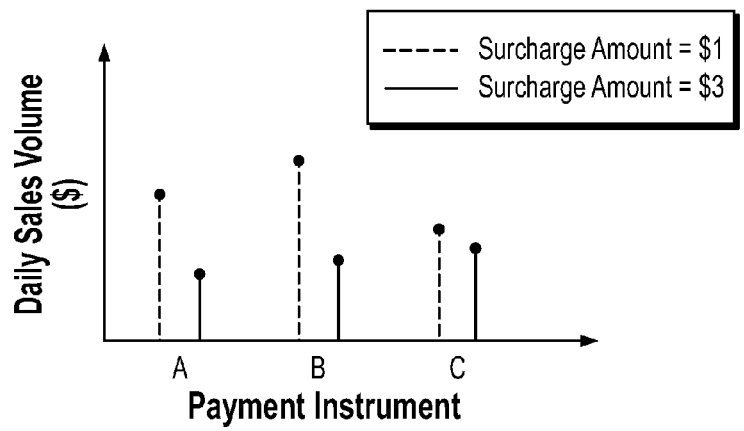
FIGS. 14A and 14B show illustrative information in accordance with the principles of the invention.

FIG. 14A shows illustrative information 1400. Information 1400 includes a plurality of transaction records. Each of the plurality of transaction records includes the surcharge amount of $3. Information 1400 shows that each of the plurality of transaction records may be different with respect to transaction attributes other than the surcharge amount of $3.

FIG. 14B shows a comparison of an effect of a first surcharge amount on a first plurality of transaction records to an effect of a second surcharge on a second plurality of transaction records. Information 1401 shows that the when the surcharge amount is $1, a daily sales volume is greater than when the surcharge amount is $3. The difference is volume of daily sales may show that the surcharge amount is a key factor in influencing the daily sales volume.

Information 1401 also shows that for different payment instruments, the surcharge amount may be more or less of a factor in influencing daily sales volume. For example, payment instrument C is less affected by a difference in surcharge amount compared to payment instrument A.

Figures 15A, 15B:
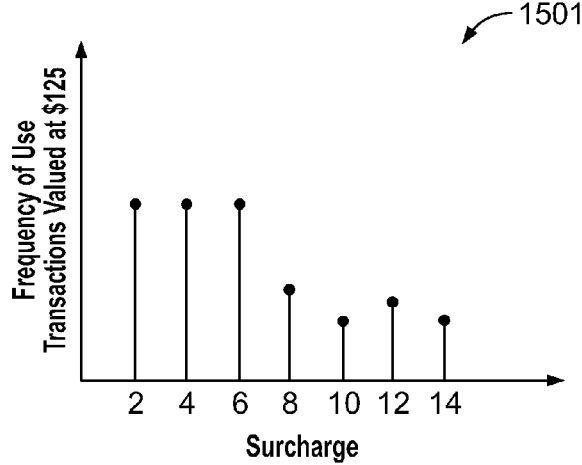
FIGS. 15A and 15B show illustrative information in accordance with the principles of the invention.

FIG. 15A shows illustrative transaction records 1500. Transaction records 1500 each include a uniform purchase amount. Information 1500 shows that each of the plurality of transaction records may be different with respect to transaction attributes other than the purchase amount of $125.

FIG. 15B shows illustrative information 1501. Information 1501 shows that for a purchase amount of $125, a surcharge amount $0-$6 does not substantially affect a frequency-of-use. When the surcharge amount is $0-$6, the surcharge amount may represent a minimal portion of the $125 purchase price. A customer may be relatively insensitive to a surcharge amount $0-$6 when the purchase amount is $125. Because of the insignificance of the surcharge amount relative to the purchase amount, a customer may continue to use a surcharged payment instrument to pay for purchase amounts of $125 or greater if the surcharge amount is $0-$6.

Information 1501 shows that when the surcharge amount is $8-$14, the frequency-of-use is affected by the surcharge amount. When the surcharge amount is $8-$14 the surcharge amount may be a more significant portion of the purchase amount of $125. A customer may be sensitive to a surcharge amount $8-$14 when the purchase amount is $125. Because of the significance of the surcharge amount relative to the purchase amount, a customer may discontinue use of a surcharged payment instrument to pay for purchase amounts of $125 or less if the surcharge amount is $8-$14.

Figure 16:
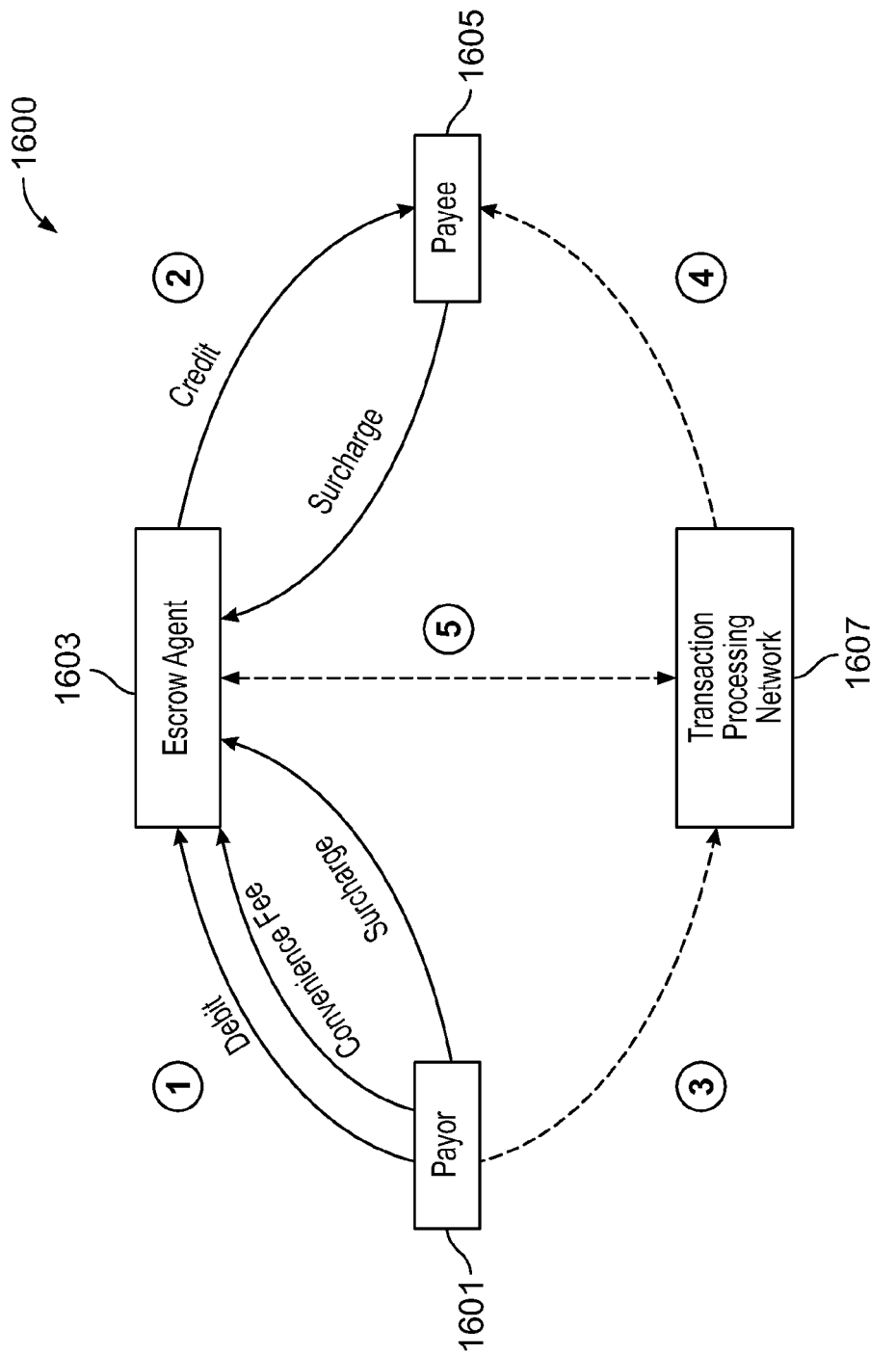
FIG. 16 shows an illustrative arrangement in which apparatus and methods in accordance with the principles of the invention may be used.

FIG. 16 shows illustrative transaction flow 1600. At step 1, payor 1601 may initiate a transfer of funds to a payor 1605. The transfer may include payee 1601 transferring funds to escrow agent 1603. Escrow agent 1603 may charge payee 1601 a convenience fee for acting as an intermediary between payee 1601 and payor 1605. The convenience fee may cover expenses incurred by escrow agent 1603 in providing escrow related transaction services.

Payor 1601 may transfer funds to escrow agent 1603 using a payment instrument. The payment instrument may be associated with a transaction cost. Escrow agent 1603 may impose a surcharge to offset the transaction cost associated with receiving funds via a payment instrument.

At step 2, Escrow agent 1603 may release funds to payee 1605. Payee 1605 may request that the funds be credited to a payment instrument. Crediting the payment instrument may be associated with a transaction cost. Escrow agent may impose a surcharge to offset the transaction cost of crediting the payment instrument.

Steps 3, 4 and 5 show illustrative transaction flows that involve transaction processing network 1607. Steps 3, 4 and 5 are shown in broken line because interaction with transaction processing network 1607 may be transparent from a perspective of payor 1601 and payee 1605.

When payor 1601 requests a transfer of funds to escrow agent 1603 via a payment instrument, the transfer may be routed through transaction processing network 1607. When payee 1605 requests a credit of funds from escrow agent 1603 to a payment instrument, the credit may be routed through transaction processing network 1607.

When escrow agent 1603 accepts funds from payor 1601, the funds may be transferred via transaction processing network 1607. When escrow agent 1603 credits funds to payee 1605, the funds may be transferred via transaction processing network 1607.

Transaction processing network 1607 may provide transaction processing services to payor 1601, escrow agent 1603 and payee 1605. For example, transaction processing network may verify that payor 1601 has sufficient credit or funds in account associated with a payment instrument. Transaction processing network may request that payor 1601 confirm the transfer of funds to escrow agent 1603. Transaction processing network 1607 may provide settlement services to escrow agent 1603. Transaction processing network 1607 may maintain an account holding the credit attributed to payee 1605.

The transaction processing network may charge a fee for each service provided. The cost of the transaction services provided by transaction processing network 1607 may be shared among payor 1601, escrow agent 1603 and payee 1605. Imposing a surcharge may be a method of sharing the transaction cost among payor 1601, escrow agent 1603 and payee 1605. A sharing of the transaction cost allows escrow agent 1603 to avoid bearing the entire transaction cost charged by transaction processing network 1607.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for determining a surcharge imposed on a transaction between two or more transaction participants have been provided. Persons skilled in the art will appreciate that the present invention can be practiced by other than the described embodiments, which are presented for purposes of illustration rather than of limitation. The present invention is limited only by the claims that follow.

What is claimed is:

1. A point-of-sale ("POS") system comprising:
   a merchant POS controller that controls transmission of a first plurality and a second plurality of credit card transactions captured by a POS terminal at a merchant location;
   an issuer transaction processing system that determines authorization for the first and second plurality of credit card transactions;
   a surcharge engine that interfaces between the merchant POS controller and the issuer transaction processing system; wherein:
      the POS controller receives the first plurality of credit card transactions captured by the POS terminal and transmits the first plurality of credit card transactions to the issuer transaction processing system;
      the surcharge engine is configured to intercept the credit card transactions before the first plurality of credit card transactions are received by the issuer transaction processing system;
      in response to intercepting the first plurality of credit card transactions, the surcharge engine performs a computer-implemented method for dynamically controlling a flow of transaction information between the authorization engine and the merchant POS controller, the method comprising:
         intercepting the first plurality of credit card transactions transmitted by the POS controller, each transaction in the first plurality of credit card transactions comprising:
            a surcharge amount imposed by the merchant POS controller; and
            a payment instrument;
         determining a correlation between the surcharge amount, the payment instrument and a change in a performance metric;
         determining a transaction cost directive based on the correlation, the transaction cost directive requesting that the issuer transaction processing system lower a transaction cost imposed on the merchant for authorizing the second plurality of credit card transactions;
         transmitting the transaction cost directive to the issuer transaction processing system;
         receiving, from the issuer transaction processing system, a transaction cost adjustment in response to the transaction cost directive, wherein, the transaction cost adjustment lowers the transaction cost imposed on the merchant by the issuer transaction processing system for authorizing the second plurality of credit card transactions;
         determining, based on the transaction cost adjustment, an adjusted surcharge amount;
         determining a surcharge directive based on the correlation, the surcharge directive requesting that the merchant POS controller lower the surcharge amount to less than the adjusted surcharge amount;
         transmitting the surcharge directive to the merchant POS controller;
         in response to transmitting the surcharge directive, receiving a withdrawal notice confirming that the merchant POS controller has lowered the surcharge amount to less than the adjusted surcharge amount;
         transmitting the lowered surcharge amount to the issuer transaction processing system;
         receiving authorization for the lowered surcharge amount from the issuer transaction processing system; and
         transmitting the authorization for the lowered surcharge amount to the merchant POS controller; and
      in response to receiving the authorization, the merchant POS controller configures the POS terminal to impose the lowered surcharge amount on the second plurality of credit card transactions.

2. The POS system of claim 1 wherein, the adjusted surcharge amount comprises:
   an adjusted surcharge fraction; or
   an adjusted fixed fee.

3. The POS system of claim 1 wherein, the payment instrument is associated with a transaction processing network.

4. The POS system of claim 3 wherein, the performance metric corresponds to a number of transaction records transmitted, during a pre-determined time, from a merchant to the transaction processing network.

5. The POS system of claim 1 wherein, the transaction cost directive comprises a request for a reduction in the transaction cost associated with the payment instrument.

6. The POS system of claim 1 further comprising computer readable program code for causing the surcharge engine to:
   receive a suspension notice from the merchant POS controller in response to the surcharge directive; and
   in response to receiving the suspension notice, disconnecting the merchant from the issuer transaction processing system.

7. The POS system of claim 1, wherein the method performed by the surcharge engine further comprises:
   identifying a surcharge violation associated with the surcharge amount imposed by the merchant POS controller; and
   transmitting a violation notice to the issuer transaction processing system.

8. The POS system of claim 1 wherein, the change in the performance metric is a first change, the computer implemented method performed by the surcharge engine further comprises:
   applying the surcharge amount to the second plurality of credit card transactions during a pre-determined time period, the second plurality of credit card transactions being associated with a second payment instrument;
   determining, during the pre-determined time period, a second change in the performance metric;
   comparing the first change to the second change; and
   transmitting the transaction cost directive when the difference between the first change and the second change exceeds a threshold difference.

9. The POS system of claim 1 wherein the performance metric corresponds to a frequency-of-use associated with the payment instrument.

10. The POS system of claim 1 wherein the performance metric corresponds to an amount of interchange revenue associated with the payment instrument.

11. The POS system of claim 1 wherein the performance metric corresponds to a difference between:
- a first number of transaction records transmitted, during the pre-determined time period, from the merchant POS controller to a first transaction processing network; and
- a second number of transaction records transmitted, during the pre-determined time period, from the merchant POS controller to a second transaction processing network.

12. The POS system of claim 1 comprising computer readable program code for causing the surcharge engine to adjust the surcharge amount in response to the first plurality of credit card transactions being associated with a geographic region.

13. The POS system of claim 1 comprising computer readable program code for causing the surcharge engine to adjust the surcharge amount during a threshold time period.

\* \* \* \* \*